(12) United States Patent
Pettovello

(10) Patent No.: US 8,631,028 B1
(45) Date of Patent: Jan. 14, 2014

(54) XPATH QUERY PROCESSING IMPROVEMENTS

(76) Inventor: Primo M. Pettovello, Canton, MI (US)

( * ) Notice: Subject to any disclaimer, the term of this patent is extended or adjusted under 35 U.S.C. 154(b) by 0 days.

(21) Appl. No.: 12/915,791

(22) Filed: Oct. 29, 2010

Related U.S. Application Data

(60) Provisional application No. 61/255,994, filed on Oct. 29, 2009.

(51) Int. Cl.
*G06F 7/00* (2006.01)

(52) U.S. Cl.
USPC .................................................. 707/765

(58) Field of Classification Search
None
See application file for complete search history.

(56) References Cited

U.S. PATENT DOCUMENTS

| | | | |
|---|---|---|---|
| 5,488,717 A | 1/1996 | Gibson et al. |
| 5,657,241 A | 8/1997 | Butts et al. |
| 5,671,416 A | 9/1997 | Elson |
| 5,737,732 A | 4/1998 | Gibson et al. |
| RE35,881 E | 8/1998 | Barrett et al. |
| 5,893,102 A | 4/1999 | Maimone et al. |
| 5,987,449 A | 11/1999 | Suciu |
| 5,999,926 A | 12/1999 | Suciu |
| 6,121,901 A | 9/2000 | Welch et al. |
| 6,154,213 A | 11/2000 | Rennison et al. |
| 6,256,642 B1 | 7/2001 | Krueger et al. |
| 6,259,444 B1 | 7/2001 | Palmer et al. |
| 6,415,279 B1 | 7/2002 | Gard et al. |
| 6,505,205 B1 | 1/2003 | Kothuri et al. |
| 6,675,160 B2 | 1/2004 | Hara et al. |
| 6,772,165 B2 | 8/2004 | O'Carroll |
| 6,804,677 B2 | 10/2004 | Shadmon et al. |
| 6,871,204 B2 | 3/2005 | Krishnaprasad et al. |
| 6,901,410 B2 | 5/2005 | Marron et al. |
| 6,904,454 B2 | 6/2005 | Stickler |
| 7,062,507 B2 | 6/2006 | Wang et al. |
| 7,219,091 B1 * | 5/2007 | Bruno et al. ..................... 707/3 |
| 7,415,463 B2 | 8/2008 | Testa |
| 7,415,472 B2 | 8/2008 | Testa |
| 7,509,305 B2 | 3/2009 | Tozawa et al. |
| 2001/0039570 A1 | 11/2001 | Stewart et al. |
| 2002/0010741 A1 | 1/2002 | Stewart et al. |
| 2002/0013759 A1 | 1/2002 | Stewart et al. |
| 2002/0019797 A1 | 2/2002 | Stewart et al. |

(Continued)

OTHER PUBLICATIONS

Horowitz, E. et al., "Fundamentals of Data Structures in C++," Computer Science Press, 1995 (1 pg.).

Deshpande, A. et al., "Cache-and-Query for Wide Area Sensor Databases," SIGMOND 2003, Jun. 9-12, 2003, San Diego, CA, pp. 503-514.

Bonifati, A., et al., "XPath Lookup Queries in P2P Networks," WIDM '04, Nov. 12-13, 2004, Washington, DC, pp. 48-55.

Aspnes, J. et al., "Skip Graphs," Dept. of Computer Science, Yale University, pp. 384-393.

(Continued)

*Primary Examiner* — Robert Beausoliel, Jr.
*Assistant Examiner* — Nirav K Khakhar
(74) *Attorney, Agent, or Firm* — Brooks Kushman P.C.

(57) ABSTRACT

A method for processing an inputted XPath query against an inputted XML document is provided. The method generates a summary index, an ancestor-descendant path index, and a value index from one or more inputted XML documents. The summary index and the ancestor-descendant path index and the value index have at least one path defined. XPath queries at articulation points are parsed into multiple partial queries. The cursor type index access methods are determined. Partial queries are executed against the SUM-Index to generate a list of path identifiers (PID) satisfies the partial query segments. A set of ancestor-descendant PID identifiers list is generated to provide a result sequence. The result sequence of nodes is filtered producing one or more outputted XML documents from the final result sequence of nodes. A related system and computer medium is also provided.

22 Claims, 17 Drawing Sheets

(56) References Cited

U.S. PATENT DOCUMENTS

| | | |
|---|---|---|
| 2002/0054090 A1 | 5/2002 | Silva et al. |
| 2002/0078094 A1 | 6/2002 | Krishnaprasad et al. |
| 2002/0091539 A1 | 7/2002 | Yin et al. |
| 2002/0091579 A1 | 7/2002 | Yehia et al. |
| 2002/0091614 A1 | 7/2002 | Yehia et al. |
| 2002/0099687 A1 | 7/2002 | Krishnaprasad et al. |
| 2002/0107973 A1 | 8/2002 | Lennon et al. |
| 2002/0120685 A1 | 8/2002 | Srivastava et al. |
| 2002/0129000 A1 | 9/2002 | Pillai et al. |
| 2002/0133497 A1 | 9/2002 | Draper et al. |
| 2002/0138582 A1 | 9/2002 | Chandra et al. |
| 2002/0147726 A1 | 10/2002 | Yehia et al. |
| 2002/0152267 A1 | 10/2002 | Lennon |
| 2002/0156693 A1 | 10/2002 | Stewart et al. |
| 2002/0161688 A1 | 10/2002 | Stewart et al. |
| 2002/0161801 A1 | 10/2002 | Hind et al. |
| 2002/0170070 A1 | 11/2002 | Rising, III et al. |
| 2002/0174147 A1 | 11/2002 | Wang et al. |
| 2002/0198905 A1 | 12/2002 | Tabatabai et al. |
| 2003/0018607 A1 | 1/2003 | Lennon et al. |
| 2003/0018668 A1 | 1/2003 | Britton et al. |
| 2003/0028557 A1 | 2/2003 | Walker et al. |
| 2003/0041065 A1 | 2/2003 | Lucovsky et al. |
| 2003/0041076 A1 | 2/2003 | Lucovsky et al. |
| 2003/0046317 A1 | 3/2003 | Cseri et al. |
| 2003/0050911 A1 | 3/2003 | Lucovsky et al. |
| 2003/0061229 A1 | 3/2003 | Lusen et al. |
| 2003/0065874 A1 | 4/2003 | Marron et al. |
| 2003/0069881 A1 | 4/2003 | Huttunen |
| 2003/0069887 A1 | 4/2003 | Lucovsky et al. |
| 2003/0070158 A1 | 4/2003 | Lucas et al. |
| 2003/0074352 A1 | 4/2003 | Raboczi et al. |
| 2003/0084180 A1 | 5/2003 | Azami |
| 2003/0088573 A1 | 5/2003 | Stickler |
| 2003/0088593 A1 | 5/2003 | Stickler |
| 2003/0093434 A1 | 5/2003 | Stickler |
| 2003/0093755 A1 | 5/2003 | O'Carroll |
| 2003/0097365 A1 | 5/2003 | Stickler |
| 2003/0097485 A1 | 5/2003 | Horvitz et al. |
| 2003/0101190 A1 | 5/2003 | Horvitz et al. |
| 2003/0105746 A1 | 6/2003 | Stickler |
| 2003/0110442 A1 | 6/2003 | Battle |
| 2003/0115228 A1 | 6/2003 | Horvitz et al. |
| 2003/0120978 A1 | 6/2003 | Fabbrizio et al. |
| 2003/0125929 A1 | 7/2003 | Bergstraesser et al. |
| 2003/0131069 A1 | 7/2003 | Lucovsky et al. |
| 2003/0131073 A1 | 7/2003 | Lucovsky et al. |
| 2003/0131142 A1 | 7/2003 | Horvitz et al. |
| 2003/0158836 A1 | 8/2003 | Venkatesh et al. |
| 2003/0171962 A1 | 9/2003 | Hirth et al. |
| 2003/0172007 A1 | 9/2003 | Helmolt et al. |
| 2003/0172196 A1 | 9/2003 | Hejlsberg et al. |
| 2003/0193994 A1 | 10/2003 | Stickler |
| 2003/0200502 A1 | 10/2003 | Abe et al. |
| 2003/0212657 A1 | 11/2003 | Kaluskar et al. |
| 2003/0212664 A1 | 11/2003 | Breining et al. |
| 2003/0225825 A1 | 12/2003 | Healey et al. |
| 2004/0002976 A1 | 1/2004 | Lucovsky |
| 2004/0006563 A1 | 1/2004 | Zwiegincew et al. |
| 2004/0006564 A1 | 1/2004 | Lucovsky et al. |
| 2004/0006590 A1 | 1/2004 | Lucovsky et al. |
| 2004/0010754 A1 | 1/2004 | Jones |
| 2004/0015783 A1 | 1/2004 | Lennon et al. |
| 2004/0024875 A1 | 2/2004 | Horvitz et al. |
| 2004/0028212 A1 | 2/2004 | Lok et al. |
| 2004/0034830 A1 | 2/2004 | Fuchs et al. |
| 2004/0039734 A1 | 2/2004 | Judd et al. |
| 2004/0044659 A1 | 3/2004 | Judd et al. |
| 2004/0044680 A1 | 3/2004 | Thorpe et al. |
| 2004/0044961 A1 | 3/2004 | Pesenson |
| 2004/0044965 A1 | 3/2004 | Toyama et al. |
| 2004/0044990 A1 | 3/2004 | Schloegel et al. |
| 2004/0046789 A1 | 3/2004 | Inanoria |
| 2004/0060002 A1 | 3/2004 | Lucovsky et al. |
| 2004/0060006 A1 | 3/2004 | Lindblad et al. |
| 2004/0060007 A1 | 3/2004 | Gottlob et al. |
| 2004/0064466 A1 | 4/2004 | Manikutty et al. |
| 2004/0073541 A1 | 4/2004 | Lindblad et al. |
| 2004/0088320 A1 | 5/2004 | Perry |
| 2004/0098384 A1* | 5/2004 | Min et al. .................. 707/3 |
| 2004/0098667 A1 | 5/2004 | Atkinson |
| 2004/0103091 A1 | 5/2004 | Lindblad et al. |
| 2004/0103105 A1 | 5/2004 | Lindblad et al. |
| 2004/0111396 A1 | 6/2004 | Musayev et al. |
| 2004/0117439 A1 | 6/2004 | Levett et al. |
| 2004/0122844 A1 | 6/2004 | Malloy et al. |
| 2004/0126094 A1 | 7/2004 | Kotani |
| 2004/0148213 A1 | 7/2004 | Aziz et al. |
| 2004/0148214 A1 | 7/2004 | Aziz et al. |
| 2004/0148299 A1 | 7/2004 | Teegan et al. |
| 2004/0148375 A1 | 7/2004 | Levett et al. |
| 2004/0153871 A1 | 8/2004 | Pietschker et al. |
| 2004/0163041 A1 | 8/2004 | Engel |
| 2004/0181511 A1 | 9/2004 | Xu et al. |
| 2004/0181543 A1 | 9/2004 | Wu et al. |
| 2004/0199861 A1 | 10/2004 | Lucovsky |
| 2004/0199869 A1 | 10/2004 | Lucovsky et al. |
| 2004/0205082 A1 | 10/2004 | Fontoura et al. |
| 2004/0205577 A1 | 10/2004 | Abe et al. |
| 2004/0205605 A1 | 10/2004 | Adler et al. |
| 2004/0210573 A1 | 10/2004 | Abe et al. |
| 2004/0210839 A1 | 10/2004 | Lucovsky |
| 2004/0215600 A1 | 10/2004 | Aridor et al. |
| 2004/0220895 A1 | 11/2004 | Carus et al. |
| 2004/0221229 A1 | 11/2004 | Perry |
| 2004/0230583 A1 | 11/2004 | Testa |
| 2004/0230602 A1 | 11/2004 | Duddington |
| 2004/0230674 A1 | 11/2004 | Pourheidari et al. |
| 2004/0230943 A1 | 11/2004 | Pourheidari et al. |
| 2004/0243931 A1 | 12/2004 | Stevens et al. |
| 2004/0249844 A1 | 12/2004 | Kotani |
| 2004/0260685 A1 | 12/2004 | Pfleiger et al. |
| 2004/0261019 A1 | 12/2004 | Imamura et al. |
| 2004/0267747 A1 | 12/2004 | Choi et al. |
| 2004/0267760 A1 | 12/2004 | Brundage et al. |
| 2004/0267876 A1 | 12/2004 | Kakivaya et al. |
| 2004/0268236 A1 | 12/2004 | Chidlovskii et al. |
| 2005/0004892 A1 | 1/2005 | Brundage et al. |
| 2005/0015797 A1 | 1/2005 | Noblecourt et al. |
| 2005/0021512 A1 | 1/2005 | Koenig |
| 2005/0021838 A1 | 1/2005 | Levett |
| 2005/0022115 A1 | 1/2005 | Baumgartner et al. |
| 2005/0038785 A1 | 2/2005 | Agrawal et al. |
| 2005/0039119 A1 | 2/2005 | Parks et al. |
| 2005/0050068 A1 | 3/2005 | Vaschillo et al. |
| 2005/0055358 A1 | 3/2005 | Krishnaprasad et al. |
| 2005/0055365 A1 | 3/2005 | Ramakrishnan et al. |
| 2005/0060252 A1 | 3/2005 | Doddington |
| 2005/0060647 A1 | 3/2005 | Doan et al. |
| 2005/0065949 A1 | 3/2005 | Warner et al. |
| 2005/0091093 A1 | 4/2005 | Bhaskaran et al. |
| 2005/0091424 A1 | 4/2005 | Snover et al. |
| 2005/0097084 A1 | 5/2005 | Balmin et al. |
| 2005/0102256 A1 | 5/2005 | Bordawekar et al. |
| 2005/0108203 A1 | 5/2005 | Tang et al. |
| 2005/0108630 A1 | 5/2005 | Wasson et al. |
| 2005/0129017 A1 | 6/2005 | Guingo et al. |
| 2005/0160412 A1 | 7/2005 | Thurner |
| 2005/0228792 A1 | 10/2005 | Chandrasekaran |
| 2005/0257201 A1 | 11/2005 | Rose et al. |
| 2006/0031233 A1 | 2/2006 | Liu et al. |
| 2006/0064432 A1 | 3/2006 | Pettovello |
| 2006/0268934 A1 | 11/2006 | Shimizu et al. |
| 2007/0047463 A1 | 3/2007 | Jarvis et al. |
| 2007/0118547 A1 | 5/2007 | Gupta et al. |
| 2007/0127477 A1 | 6/2007 | Peng et al. |
| 2007/0168659 A1 | 7/2007 | Gentry et al. |
| 2008/0010302 A1* | 1/2008 | Fontoura et al. ............ 707/100 |
| 2008/0065596 A1 | 3/2008 | Shadmon et al. |

(56) References Cited

U.S. PATENT DOCUMENTS

2008/0071733 A1   3/2008  Shadmon et al.
2008/0071809 A1   3/2008  Lomet
2010/0030727 A1*  2/2010  Chandrasekar et al. .......... 707/2

OTHER PUBLICATIONS

Jagadish, H.V. et al., "VBI-Tree: A Peer-to-Peer Framework for Supporting Multi-Dimensional Indexing Schemes," Proceedings of the 22nd Int'l Conf. on Data Engineering (ICDE '06), 10 pgs.
Tanenbaum, A., "Distributed File System Design," Distributed Operating Systems, Prentice-Hall Chapter 5—Distributed File Systems, Library of Congress 1995, p. 249.
Sinha, P.K., "Distributed Operating Systems—Concepts and Design," IEEE Computer Science Press, IEEE Press, NY, Chapter 10 Naming, 1997, p. 534.
Pugh, W., "Skip Lists: A Probabilistic Alternative to Balanced Trees," Communications of the ACM, Jun. 1990, v. 33, n. 6, pp. 668-676.
Jagadish, H.V. et al., "Baton: A Balanced Tree Structure for Peer-to-Peer Networks," Proceedings of the 31st VLDB Conference, Trondheim, Norway, 2005, pp. 661-672.
Manku, et al., "Know they Neighbor's Neighbor: the Power of Lookahead in Randomized P2P Networks," STOC '04, Jun. 13-15-, 2004, Chicago, IL, pp. 54-63.
OOI, Beng Chin et al., "Index Nesting—an Efficient approach to indexing in object-oriented databases," The VLDB Journal, 1996, pp. 215-228.
Al-Khalifa, Shurug, "Structural Joins: A Primitive for Efficient XML Query Pattern Matching," Proceedings of the 18th International Conference on Data Engineering (ICDE '02), 2002, 12 pages.
Bruno, Nicolas et al., "Navigation- vs. Index-Based XML Multi-Query Processing," Proceedings of the 19th International Conference on Data Engineering (ICDE'03), pp. 139-150.
Comer, Douglas, "The Ubiquitous B-Tree," Computing Surveys, v. 11., n. 2, pp. 121-137, Jun. 1979.
Cooper, Brian F. et al., "A Fast Index for Semistructured Data," Proceedings of the 27th VLDB Conference, Roma, Italy, 2001, 10 pages.
Cormen, Thomas H., "Introduction to Algorithms," MIT Press 1995, p. 215.
Fiebig, Thorsten et al., "Anatomy of a native XML base management system," The VLDB Journal (2002), 11:293-314.
Grust, Torsten, "Accelerating XPath Location Steps," ACM SIGMOD 2002, Jun. 4-6, 2002, Madison, WI, pp. 109-120.
Haerder, Theo, "Implementing a Generalized Access Path Structure for a Relational Database System," ACM Transactions on Database Systems, v. 3, n. 3, Sep. 1978, pp. 285-298.
Hidders, Jan et al., "Efficient XPath Axis Evaluation for DOM Data Structures," Workshop on Programming Language Technologies for SML PLAN-X 2004, Nr. NS-03-4 Venice, Italy, 2004, pp. 1-10.
Kaushik, Raghav et al., "Covering Indexes for Branching Path Queries," ACM SIGMOD, Madison, WI, Jun. 4-6, 2002, pp. 133-144.
Kaushik, Raghav et al., "On the Integration of Structure Indexes and Inverted Lists," SIGMOD 2004, Jun. 13-18, 2004, Paris, France, 12 pages.
Krishnamurthy, Rajasekar et al., "XML-to-SQL Query Translation Literature: The State of the Art and Open Problems," Proc. of the 1st Int'l XML Database Symposium (XSym), Berlin, Germany, 2003, 17 pages.
Li, Hanyu et al., "An Evaluation of XML Indexes for Structural Join," SIGMOD Record, v. 33, n. 3, Sep. 2004, pp. 28-33.
Li, Quanzhong et al., "Indexing and Querying XML Data for Regular Path Expressions," Proceedings of the 27th VLDB Conference, Roma, Italy, 2001, pp. 361-370.
Mathis, Christian et al., "Locking-Aware Structural Join Operators for XML Query Processing," SIGMOD 2006, Jun. 27-29, 2006, Chicago, IL, pp. 467-478.
Mehta, Dinesh et al., "Handbook of Data Structures and Applications," 15-12 (1 page), 2004, http://books.google.com/books?id=_EBO6lhh35sC&printsec=frontcover&dq=Handbook+of+data+structure&cd=1#v=onepage&q=Handbook%20of%20data%20structure&f=false.
Mullins, Judy et al., "An Integrated Data Structure with Multiple Access Paths for Database Systems," Computer Science Telecommunications, pp. 57-64, 1992.
Oracle, "Oracle9i Index-Organized Tables Technical Whitepaper—An Oracle White Paper", Sep. 2001, pp. 1-11.
Oracle, "Technical Comparison of Oracle Database vs. IBM DB2 UDB: Focus on Performance—An Oracle White Paper," May 2005, pp. 1-23.
Rys, Michael et al., "XML and Relational Database Management Systems: the Inside Story," SIMOD '05, 2005, Baltimore, MD, pp. 945-947.
Rys, Michael, "XML and Relational Database Management Systems: Inside Microsoft® SQL Server™ 2005," SIGMOD 2005, Jun. 14-15, 2005, Baltimore, MD, pp. 958-962.
Seeger, Bernhard et al., "Multi-Disk B-trees," 1991 ACM, pp. 436-445.
Shui, William M. et al., "Querying and Maintaining ordered XML Data Using Relational Databases," copyright 2005, pp. 85-94.
Tatarinov, Igor et al., "Storing and Querying Ordered XML Using a Relational Database System," ACM SIGMOD 2002, Jun. 4-6, 2002, Madison, WI, pp. 204-215.
Wang, Fusheng et al., "Bridging Relational Database History and the Web: the XML Approach," WIDM '06, Nov. 10, 2006, Arlington, VA, pp. 3-10.
Yang, Beverly et al., "Virtual Cursors for XML Joins," CIKM '04, Nov. 8-13, 2004, Washington, DC, pp. 523-532.
Zhang, Guogen, "Building a Scalable Native XML Database Engine on Infrastructure for a Relational Database," XIME-P 2005, Jun. 16-7, 2005, Baltimore, MD, 8 pages.
Non-Final Office Action mailed Dec. 11, 2007 in related case, U.S. Appl. No. 11/233,869, filed Sep. 22, 2005 (23 pgs.).
Final Office Action mailed Sep. 23, 2008 in related case, U.S. Appl. No. 11/233,869, filed Sep. 22, 2005 (25 pgs.).
Non-Final Office Action mailed Apr. 7, 2009 in related case, U.S. Appl. No. 11/233,869, filed Sep. 22, 2005 (19 pgs.).
Final Office Action mailed Jan. 28, 2010 in related case, U.S. Appl. No. 11/233,869, filed Sep. 22, 2005 (22 pgs.).
Final Office Action mailed Feb. 23, 2011 in related case, U.S. Appl. No. 11/233,869, filed Sep. 22, 2005 (21 pgs).
Non-Final Action mailed Aug. 19, 2008 in related case, U.S. Appl. No. 11/559,887, filed Nov. 14, 2006 (16 pgs).
Final Office Action mailed May 13, 2009 in related case, U.S. Appl. No. 11/559,887, filed Nov. 14, 2006 (10 pgs).
Non-Final Office Action mailed Nov. 28, 2008 in related case, U.S. Appl. No. 11/624,510, filed Jan. 18, 2007 (24 pgs).
Final Office Action mailed Sep. 9, 2009 in related case, U.S. Appl. No. 11/624,510, filed Jan. 18, 2007 (23 pgs).
Non-Final Office Action mailed Mar. 30, 2010 in related case, U.S. Appl. No. 11/624,510, filed Jan. 18, 2007 (37 pgs).
Final Office Action mailed Dec. 8, 2010 in related case, U.S. Appl. No. 11/624,510, filed Jan. 18, 2007 (28 pgs).
Final Office Action mailed Aug. 25, 2011 in related case, U.S. Appl. No. 11/233,869, filed Sep. 22, 2005, 25 pgs.
Final Office Action mailed Jan. 30, 2012 in related case, U.S. Appl. No. 11/624,510, filed Jan. 18, 2007, (37 pgs).
Non-Final Office Action mailed Jul. 11, 2011 in related case, U.S. Appl. No. 11/624,510, filed Jan. 18, 2007 (40 pgs).
Non-Final Office Action mailed Jul. 11, 2011 in related case, U.S. Appl. No. 12/695,231, filed Jan. 28, 2010 (23 pgs).
Office Action mailed Jul. 24, 2013 in related U.S. Appl. No. 11/624,510, filed Jan. 18, 2007, 31 pgs.

* cited by examiner

Algorithm 1 MPBPC

ExecuteQuery() {
1  If (query is solvable)
2     WalkCursorTree(0, *first*, *ff(first)*);
3 }

TestAndAdvanceCursorNode() {
1  Lookahead = getNextPID(thisKey)
2  Update Priority Heap (Lookahead)
3 }

WalkCursorTree(*cursorTreeLevel, A, Z*) {
1  While (cursor nodes exist) {
2     Get next *pre* from cursor node priority heap;
3     If (*pre* NOT between *A* and *Z*) return;
4     Test the predicate list for *pre*;
5     If (pass all predicates) {
6        If (*cursorTreeLevel* == *output level*) {
7           Add node to output sequence;
8        } Else {
9           *cursorTreeLevel*++;
10          WalkCursorTree(
11             *cursorTreeLevel*,
12             *pre*,
13             *ff(pre)*);
14       }
15    }
16    TestAndAdvanceCursorNode();
17 }

Fig. 17

XPATH QUERY PROCESSING IMPROVEMENTS

CROSS-REFERENCE TO RELATED APPLICATIONS

This application claims the benefit of U.S. provisional Application No. 61/255,994, filed Oct. 29, 2009, the disclosure of which is incorporated in its entirety by reference herein.

TECHNICAL FIELD

This disclosure is related to a computer system and method for processing Extensible Markup Language (XML) documents with the XML Path Language (XPath) and XML Query Language (XQuery) queries, and more particularly, to a system, method, and program product that optimizes XPath query processing by indexing XML documents with the unique root-node to leaf-node path identifier in conjunction with a path summary index, a path index, and a value index.

BACKGROUND

1. Field of the Invention

The present invention relates to index data structures and index processing methods, in particular, useful in indexing data objects relating to XML documents.

2. Background Art

XQuery is a query language that is designed to query collections of XML data. It is semantically similar to Structured Query Language (SQL). XQuery provides the means to extract and manipulate data from XML documents or any data source that can be viewed as XML, such as relational databases or office documents. XQuery uses XPath expression syntax to address specific parts of an XML document. It supplements this with a SQL-like "FLWOR expression" for performing joins. A FLWOR expression is constructed from the five clauses after which it is named: FOR, LET, WHERE, ORDER BY, RETURN. XPath is a language for selecting nodes from an XML document.

Much research has been done adapting relational technology for use with XML and XPath query processing. Several research efforts have focused on native XML databases and other research efforts have focused on hybrid approaches. Efficient XPath query processing is important because XPath is the query language used for node selection within XQuery.

Performance improvements in relational technology have been made continuously over many years. Relational technology has largely been focused on exploiting B+Tree indexes; so there is a large foundation to build upon. The hierarchical data structure of XML, coupled with the path orientation of the query languages XPath and XQuery introduce new challenges into the technology mix. XPath query performance is particularly important, as it is a core component of the XQuery language. Optimizing XPath and XQuery query performance has involved extensive research into various subject areas such as: adding new indexes, adding statistical decision making around plan optimization, adding rule based optimization, improving storage layout, and many other features, in particular, partitioned indexes.

Relational Database Management Systems (RDBMS) have a long proven history of success with a very large installed base and with large investment support. The semi-structured data content and hierarchical tree structure of an XML document, in general, previously was not thought to fit well into the relational model. Therefore, there has been much effort placed on protecting and reusing existing relational technology for XPath and XML. There are many approaches that provide XPath axes support by fitting the problem into existing RDBMS architectures, either by encoding limited additional data into the B+Tree index structure or by encoding the XML structure into relational tables. The use of structure summaries is widely adopted. Significant progress has been made toward addressing the challenges of relational algebra when handling recursive closure, accomplished by encoding tree structures. The advantage of these solutions is that existing relational database management systems can be used without modification.

SUMMARY

In at least one embodiment, disclosed are improved computer XML index data structures and associated XPath query processing algorithms which will work with both schema-defined and schema-less XML documents. The algorithms and data structures may be implemented as a system, method or program product. The improvements involve the creation of a supplementary summary index (SUM-Index), that is an index of a schema-defined XML document or an index of a schema-less XML document, that is annotated with a set of path identifiers (PID), which are used to represent the node relationship structure of an XML document in a condensed form. The SUM-Index is used in combination with the partitioned structure index (PS-index) and partitioned values index (PV-index). The XML schema may be defined and encoded in many ways, including as a set of relational tables, which includes the PID. The PS-Index is used to efficiently store the structural elements of an XML document. The PS-Index index is partitioned on PID, but may be implemented as a non-partitioned index with a composite key, or may be implemented using other index structures, or combinations thereof, without loss of generality. The partitioned values index (PV-Index) efficiently stores the values of an XML document. The PV-Index is partitioned on portions of values and may be implemented as a non-partitioned index with a composite key, or may be implemented using other index structures, or combinations thereof, without loss of generality. The index structures are processed with a simple cursor (SC) or a multi-predicate branching path cursor (MPBPC), which uses a holistic tree pattern of multilevel nested recursive simple cursors to simultaneously join all of the PID partitioned indexes in one pass of the PS-Index and one pass of the PV-Index. Once the required nodes are identified the resulting node sequence is used to construct the resulting XML document. The final result XML document construction take place as each final node is established or after all of the final nodes are established, or combinations thereof, without loss of generality.

In a first aspect, the invention provides an XPath query processing system for processing one or more inputted queries against one or more inputted XML documents, the system comprising at least one computer system that creates a first index that comprises unique root to leaf paths (SUM-Index) where each unique root to leaf path has an associated unique path identifier, creates a second index that comprises the tree nodes grouped by unique path identifiers (PS-Index), creates a third index that comprises the values of the tree nodes grouped by path identifiers (PV-Index), wherein the first index, the second index, and the third index each have at least one path identifier and are linked together by at least one path identifier (PID); and decomposes one or more XPath queries into one or more partial XPath queries; obtains a list of path identifiers from the associated first index to initialize a simple cursor (SC) access method or a multi-predicate-branching-path cursor (MPBPC) method from the one or more partial XPath queries; selects the associated second index to generate a result sequence of nodes using a simple cursor or a MPBPC cursor; selects the associated third index to lookup values to filter the result sequence of nodes; and produces one or more outputted XML documents from the result sequence of nodes.

In a second aspect, the invention a computer implement method for processing one or more inputted XPath queries against one or more inputted XML documents, comprising: loading a XML document into computer memory; generating an a SUM-Index index, and a PS-Index, and a PV-Index from the XML document, wherein the SUM-Index and the PS-Index and the PV-Index each have at least one PID and are linked together by at least one PID originating from the SUM-Index; parsing and splitting an XPath query at articulation points into multiple partial queries; determining the cursor type index access methods; executing a multiple partial queries against the SUM-Index to generate a list of the applicable PID in the PS-Index and the PV-Index that satisfies the partial query segments; generating the set of ancestor-descendant PID identifiers list from the associated SUM-Index tree to initialize a simple cursor or a MPBPC cursor; generating a result sequence using a simple cursor or a MPBPC cursor from the associated PS-Index tree; filtering the result sequence of nodes by using the associated PV-Index tree; producing one or more outputted XML documents from the final result sequence of nodes.

In a third aspect, the invention provides a computer readable medium having a computer product for processing one or more inputted XPath queries against one or more XML documents, which when executed by a computing device, comprises: program code that generates a SUM-Index index, and a PS-Index, and a PV-Index from the XML document, wherein the SUM-Index and the PS-Index and the PV-Index each have at least one PID and are linked together by at least one PID originating from the SUM-Index; program code that executes the parsing and splitting of an XPath query at articulation points into multiple partial queries; program code that determines the cursor type index access methods; program code that examines the SUM-Index to generate a list of the applicable PID in the PS-Index and the PV-Index that satisfies the partial query segments; program code that generates the set of ancestor-descendant PID identifiers list from the associated SUM-Index tree to initialize a simple cursor or a MPBPC cursor; program code that generates a result sequence using a simple cursor or a MPBPC cursor from the associated PS-Index tree; program code that filters the result sequence of nodes by using the associated PV-Index tree; program code that produces one or more outputted XML documents from the final result sequences of nodes.

In a fourth aspect, the invention provides a method for deploying a system for processing one or more inputted XPath queries against one or more XML documents, comprising: providing a computer infrastructure being operable to: generate an a SUM-Index index, and a PS-Index, and a PV-Index from the XML document, wherein the SUM-Index and the PS-Index and the PV-Index each have at least one PID and are linked together by at least one PID originating from the SUM-Index; execute the parsing and splitting of an XPath query at articulation points into multiple partial queries; determine the cursor type index access methods; execute multiple partial queries against the SUM-Index to generate a list of the applicable PID in the PS-Index and the PV-Index that satisfies the partial query segments; generate the set of ancestor-descendant PID identifiers list from the associated SUM-Index tree to initialize a simple cursor or a MPBPC cursor; generate a result sequence using a simple cursor or a MPBPC cursor from the associated PS-Index tree; filter the result sequence of nodes by using the associated PV-Index tree; produce one or more outputted XML documents from the final result sequences of nodes.

The illustrative aspects of the present invention are designed to solve the problems herein described and other problems not discussed. These and other features of this invention will be more readily understood from the following detailed description of the various aspects of the invention taken in conjunction with the accompanying drawings.

BRIEF DESCRIPTION OF THE DRAWINGS

FIG. 17 depicts the pseudo-code for the flowcharts depicted in FIG. 14, FIG., 15 and FIG. 16.

Figure 1:
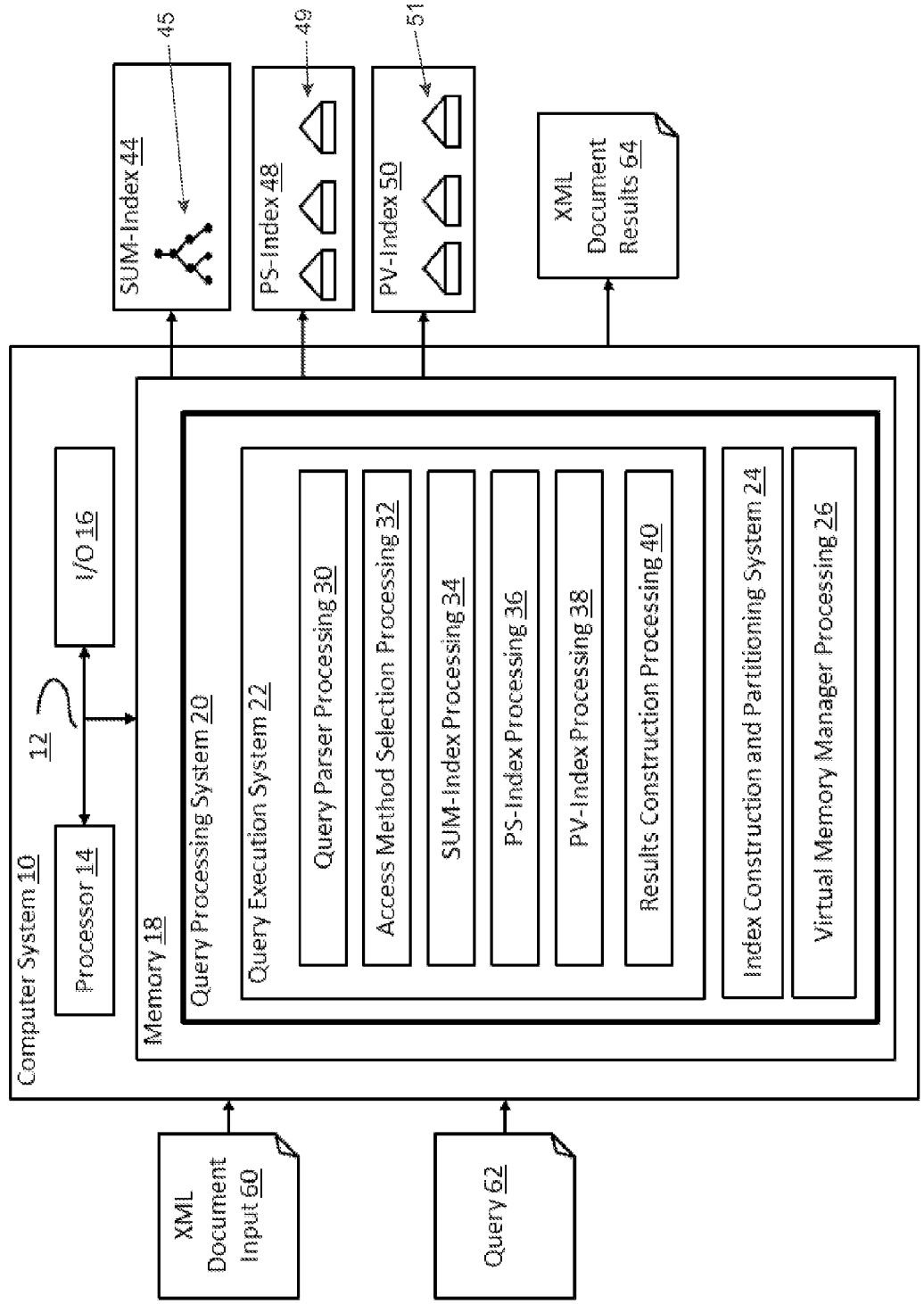
FIG. 1 depicts a computer system having an XPath processing system in accordance with an embodiment of the present invention.

The drawings are merely schematics representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to the presently preferred compositions or embodiments and methods of the invention, which constitute the best modes of practicing the invention presently known to the inventors.

The term "tree", "search tree", "index tree", or "tree structure" means a type of data structure in which each element node is attached to one or more element nodes directly beneath it. The connections between element nodes are often called branches.

The term "B+Tree" means an efficient index search tree and represents the many prior art variants.

The term "partitioned" index means an index tree that is divided into multiple index trees by a set of specified criteria. A B+Tree index can be partitioned.

The term "tree traversal" means a systematic technique for processing the nodes of a tree in some order.

The term "root node" refers to the distinguished initial or fundamental node of a tree or subtree. The root node is characterized in having no parent.

The term "relation" is a data structure which consists of a heading and an unordered or ordered set of elements which share the same type. The set of elements can have one or more search indexes associated with them. A relation has zero or more elements.

The term "Qname" refers to XML qualified names as defined by the World Wide Web Consortium (W3C). The .cndot.valuespace.cndot. of QName is the set of tuples {namespace name, local part}, where namespace name is any Uniform Resource Identifier (URI) and local part is an NCName. The .cndot.lexicalspace.cndot. of QName is the set of strings that .cndot.match.cndot. the QName production of [Namespaces in XML]. Qnames are generally used to reference particular elements or attributes within XML documents.

The term "element node" is defined by the XML standard as an "element", a logical component of a document which either begins with a QName start-tag and ends with a matching QName end-tag, or consists only of an empty-element tag. The characters between the start- and end-tags, if any, are the element's content, and may contain markup, including other elements, which are called child elements. Element nodes optionally can have values assigned to them.

The term "attribute node" is defined by the XML standard as an "attribute", a markup construct consisting of a name/value pair that exists within a start-tag or empty-element tag. Attribute nodes optionally can have values assigned to them.

The term "node attributes" means the set of attribute nodes associated with each element node.

The term "PID" means path identifier and is the unique root-node-to-leaf-node ancestor-descendant identifier.

The term "document order" is defined by the XML standard and refers to the canonical node ordering of the nodes of an XML document when processed using depth-first search (DFS), which appear in order during the XML serialization of a document. Document order satisfies the definition and constraints set forth by the XQuery/XPath Data Model (XDM).

The term "node sequence" refers to a list of nodes maintained in document order, which constitutes the context node and all nodes descended from this root. The descendants of a node do not include attribute nodes or namespace nodes.

The term "node" refers to a unit of reference in a data structure. Examples include a vertex in graphs and trees. A node may be weighted or un-weighted. If a data structure is a collection of computer systems, then a node is a computer system. Element nodes and attribute node are also nodes.

The term "pre" or "preorder" refers to the unique logical node identifier assigned to each node, which is the preorder sequence number for each node in an XML document; the preorder number of some node n is denoted pre(n).

The term "post" refers to the unique logical node identifier assigned to each node, which is the postorder sequence number for each node in an XML document; the postorder of some node n is denoted post(n)

The term "size" refers to the count of descendant nodes for some context node n; the size of some node n is denoted size(n).

The term "level" refers to the number of ancestor nodes for some context node n is the number of ancestor-descendant nodes from the root node to the context node; the level of some node n is denoted level(n).

The term "axis" as used herein refers to a sequence of nodes in relation to the context node. Examples include the ancestor axis, the child axis, the descendent axis, and the like.

The term "ancestor" refers to the axis that contains the ancestors of the context node; the ancestors of the context node consist of the parent of context node and the parent's parent and so on; thus, the ancestor axis will always include the root node, unless the context node is the root node.

The term "descendant" refers to the axis that contains the descendants of the context node. Accordingly, a descendant is a child or a child of a child and so on.

The term "following" refers to an axis that contains all nodes in the same document as the context node that are after the context node in document order. The following axis does not include any descendants, attribute nodes, or namespace nodes The term "preceding" refers to an axis that contains all nodes in the same document as the context node that are before the context node in document order. The preceding axis excludes ancestors, descendants, and following.

The term "first-child" refers to the first child node of some context node in document order.

The term "first-attribute" refers to the first attribute node associated with an element node, ordered from left to right.

The term "following-sibling" refers to the next sibling node in document order from the current context node.

The term "node-type" refers to the type of node such as element node or attribute node.

The term "PK" represents the unique primary key of a relation.

The term "FK" represents the unique foreign key of another relation. The FK in one relation is a PK in another relation.

The term "value (FK)" refers to the value entry in the PV-Index referenced by the foreign preorder key value FK.

The term "preorder (FK)" refers to the node entry in the PS-Index referenced by the foreign preorder key value FK.

The term "path identifier", called "PID", is a unique named root-to-node value. The node names are the XML qualified names associated with element nodes and attribute nodes.

The term ff(n) is a function that provides the first node in the following axis for some context node n.

The term oid(n) is a function that provides the logical preorder number foursome context node n.

The term "relation" means a relational database table structure.

The term "cursor" means a database cursor, a pointer to a location within a data structure.

The term "parse" or "parsing" means language syntactic analysis and decomposition of an XML document or XPath or XQuery query, is the process of analyzing the text that has been made into a sequence of tokens, to determine its grammatical structure with respect to a defined formal grammar.

In one embodiment of the present invention, an index data structure and query process method useful in querying data is provided. The entirety of the index is an integrated composite of several disparate index structures linked by the unique path identifier, PID. To index an XML document, each XML element or attribute node is assigned a path identifier that is unique for every root-to-node path. A separate XML path summary index, SUM-Index, is created for both schema-defined and schema-less XML documents, itself encoded as an XML document, which summarizes the document structure by eliminating path redundancies that are inherent within many XML document instances. Two additional supporting indexes are utilized: first, all the XML element and attributes nodes are placed into the structure index PS-Index which is partitioned by the PID, and second, the XML values associated with element and attribute nodes are placed into the separate value index PV-Index. The PV-Index at the first level is partitioned by the PID and at the second level, for each unique PID, partitioned by a portion of the values text.

With reference to FIG. 1, a schematic illustration of the computer architecture is provided. Computer 10 includes major components of data communications bus 12, processor 14, I/O components, memory 18, and the query processing system 20. The query processing system 20 contains the index construction and partitioning system 24, the virtual memory manager 26, and the query execution system 22. The query execution system 22 contains the query parser processing 30, the access method selection processing 32, the SUM-Index processing 34, the PS-Index processing 36, the PS-Index processing, the PV-index processing 38, and the results construction processing 40. The computer system 10 receives as input an XML document 60. The XML document is then reformulated into the SUM-Index 44, the PS-Index 48, and the PV-Index 50, without loss of original information. When an XPath query 62 is presented to the query processing system 20 the output produced is another XML document or portion thereof 64. SUM-Index 44 comprises unique root to leaf paths 45. PS-Index 48 comprises tree nodes 49 grouped by unique path identifiers. PV-Index 50 comprises values 51 of the tree nodes grouped by path identifiers.

Figure 2:
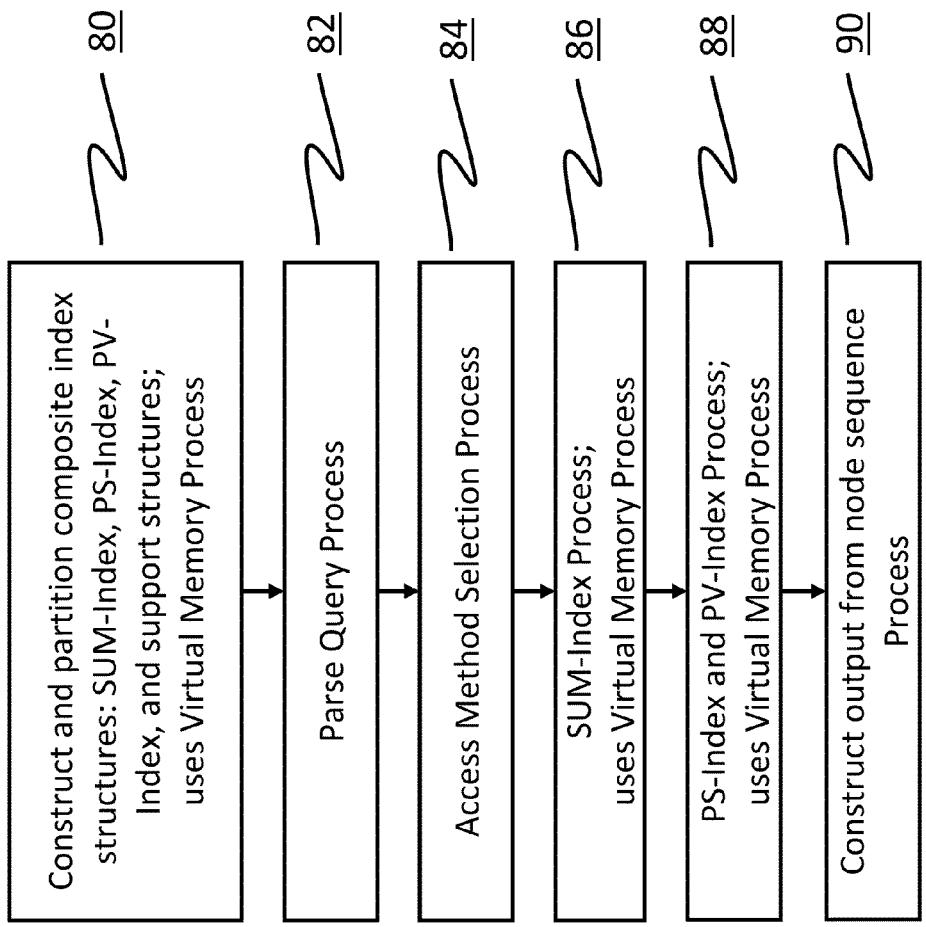
FIG. 2 depicts the high level process flow from indexing a document to producing query results.

With reference to FIG. 2, the first step is to load an XML document into the index 80, which will construct the partitioned index structures of SUM-Index, PS-Index, PV-Index, and other supporting data structures. Data can be directly mapped to storage or can be loaded using the virtual memory process 26 (FIG. 1). When XPath queries are subsequently presented to the query engine 22 (FIG. 1) the first step is to parse the query 82; the next step is to determine the appropriate access method depending on the query, the document instance, and other statistical information 84; next, the SUM-Index 86 is accessed via the virtual memory process; once candidate nodes are finalized those nodes can be presented to the PS-Index and the PV-Index processes 88; lastly, the output XML document instance or portion thereof can be constructed 90.

An XPath query can be part of an XQuery query, as XPath is the query language used for node selection within the XQuery query language.

The path summary index, SUM-Index, contains one or more paths for each unique root-to-node labeled path in the original document. Thus, SUM-Index can be a substantial summarization of the structure of the whole document. All known ancestor-descendant and parent-child relationships are encoded. Each unique root-to-leaf path is given a unique path identifier, called the PID, and it is attached as an attribute to an element node in the SUM-Index. The PID is used to link to the other index structures in the PS-Index and the PV-Index.

Figure 3:
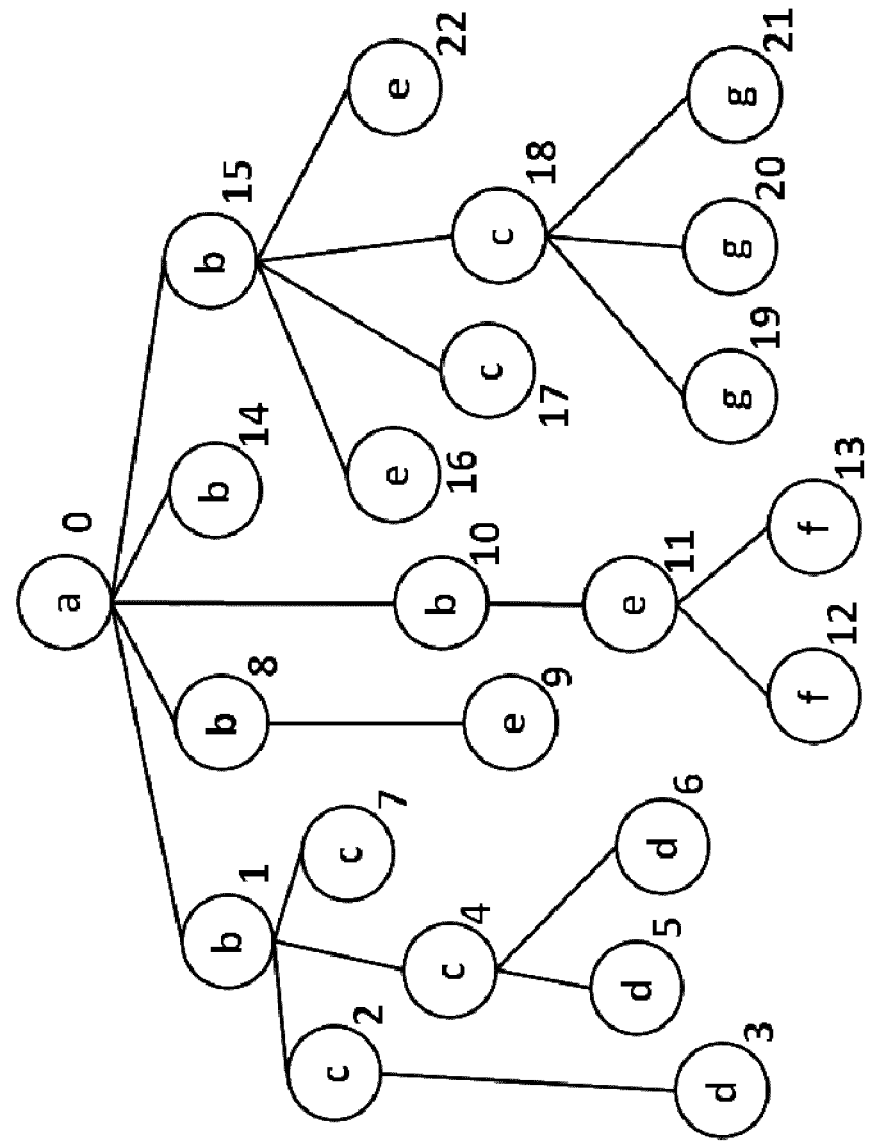
FIG. 3 depicts an example XML document instance used to illustrate the novelty of the invention.

With reference to FIG. 3, an example XML document node tree is illustrated. The XML nodes are annotated with the depth-first-search, DFS, number also known as preorder traversal sequence, also known as document order. Nodes are labeled with letters which represent element names and can represent attribute names for leaf nodes without loss of generality.

Figure 4:
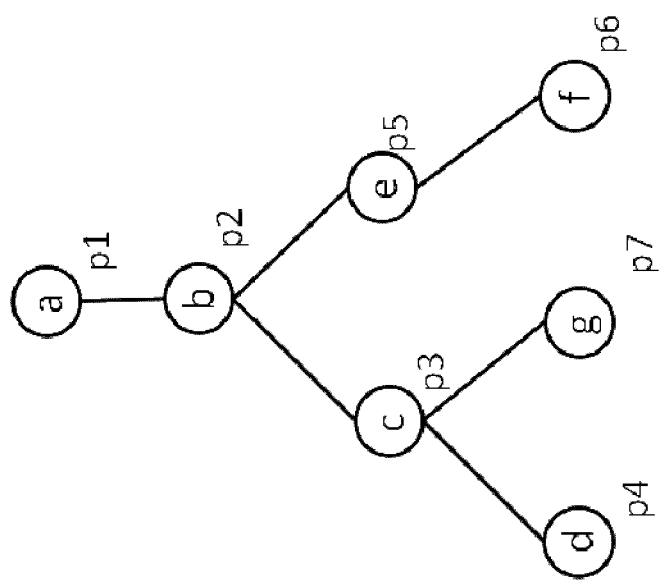
FIG. 4 depicts the constructed SUM-Index corresponding to the XML document instance from FIG. 3.

With reference to FIG. 4, the logical SUM-Index for the XML document tree depicted in FIG. 3 is shown, where each node is annotated with the PID. The representation is logical so the PID values for nodes "g", "e" and "f" appear to be out of order, but when loading the tree, the "e" node will materialize to the XML parser before the "g" node appears, but the "g" node is attached to a "c" node which materializes before the first "e" node, so the PID for the "e" node is computed before the PID for the "g" node.

The PS-index is a relation that stores the essential structural relationships of the document tree and is defined by the following relation:

STRUCTURE (preorder (PK), PID, parent, first-child, first-attribute, following-sibling, node-type, value (FK))

We exploit the following relationship:

$$ff(n)=\text{pre}(n)+\text{size}(n)=\text{level}(n)+\text{post}(n)$$

Where ff(n) is the first following node of node n.

The content of the following-sibling attribute of node n, when node n does not have a following-sibling, points to the first following node of node n: ff(n).

Containment is tested using the preorder values. A descendant is determined using the computation oid(n)<oid(d) and oid(d)<oid(ff(n)) where the oid(x) function provides the logical preorder for the supplied node parameter x, d is the descendant node, n is the context node and ff(y) is a function that provides the first follower node identifier of the provided context node parameter y.

Figure 5:
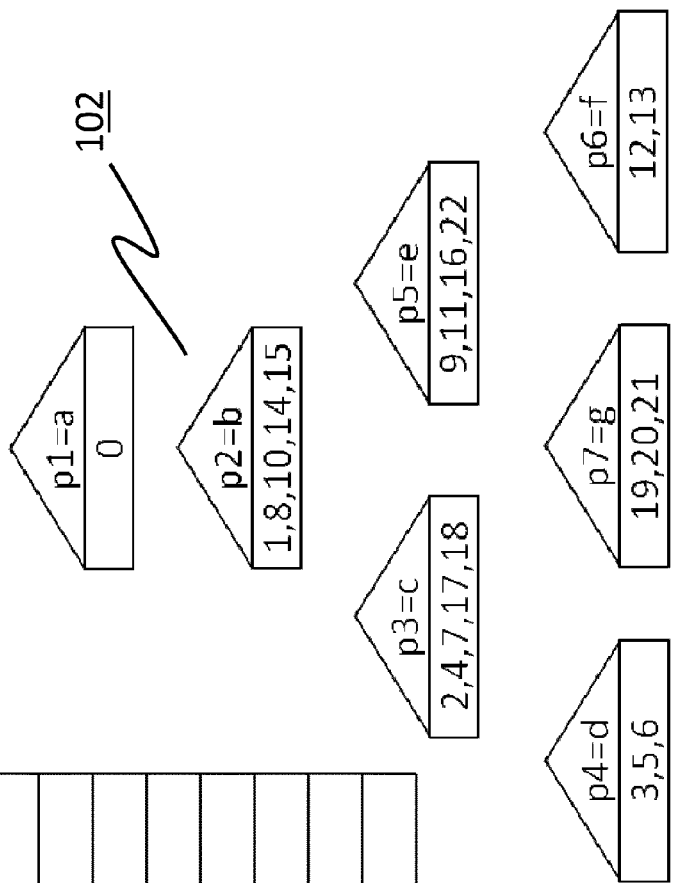
FIG. 5 depicts the constructed PS-Index corresponding to the XML document instance from FIG. 3.

With reference to FIG. 5, the PS-Index is shown. Each B+Tree is attached to a separate path partition root, partitioned on PID. The relationships of the logical partition key to the PID to the set of primary keys for each node, the set of preorder key values stored in document order, for the example document tree from FIG. 3 are shown in 100. Queries that need all of the primary keys for a specific path can get them very quickly, have them presented in document order without sorting and with good memory locality, merely by sequentially traversing the B+Tree linked list of leafs for the specified PID, when the information is stored in partitioned trees, shown in 102. The partitioned index trees for the example document tree from FIG. 3 and the relationship table shown in 100 are shown in 102. The trees shown in 102 are annotated with the PID, the associated logical partitioning key, and the leaf entries containing the preorder node numbers.

Figure 6:
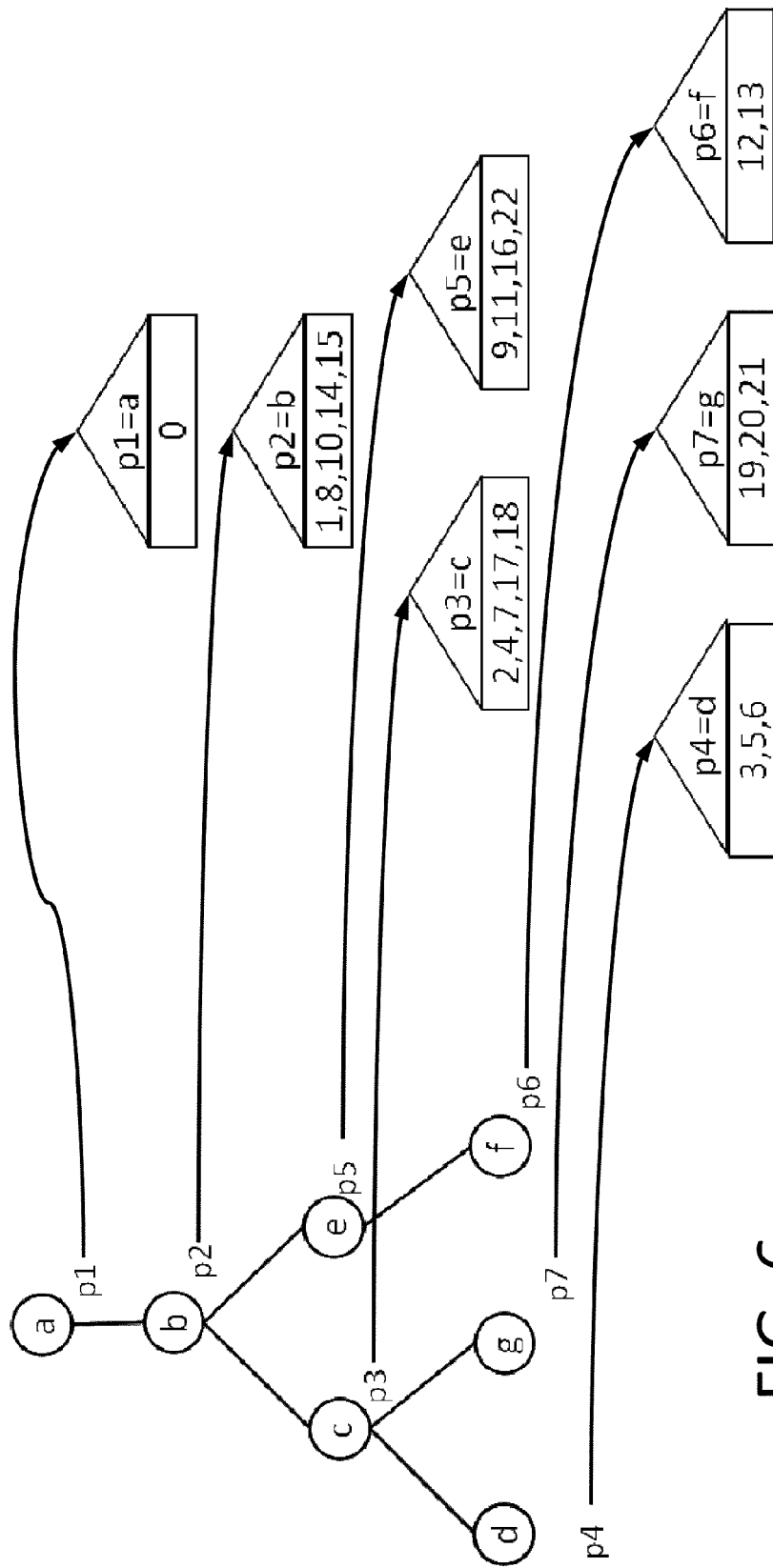
FIG. 6 depicts the constructed combined SUM-Index with linkages to the PS-Index corresponding to the XML document instance from FIG. 3.

With reference to FIG. 6, the relationship between the SUM-Index and the PS-Index are shown. The relationships are maintained by using PID linkages. The SUM-Index is used to determine the subset of relevant PID index trees to search and process.

The PV-index contains the text values associated with both the element and attribute nodes. It is defined by the following relation:

VALUE (PK, PID, preorder (FK), length, value)

The PV-index, for the first level, uses a partitioned index on PID. There are one or two level partitions, depending on the data type: (1) a first n-character partition, and (2) for those fields that are numeric, a secondary numeric partition. Each first n-character partition is the root for a B+Tree which contain the keys to VALUE tuples that are stored in document order. The first n-characters are taken from actual values from the input value text strings. When the query filter uses a field where the length is less than or equal to the length of the second level partition key, the query is resolved in the index. When the query value filter is too large to be satisfied fully in the index, the second level partition reduces the set of VALUE tuples examined. For numeric fields, at document load time, text values are tested to determine if they are numeric [38]. If the text can be converted to a number, the converted value is redundantly stored, to enable efficient numerical query processing.

Figure 7:
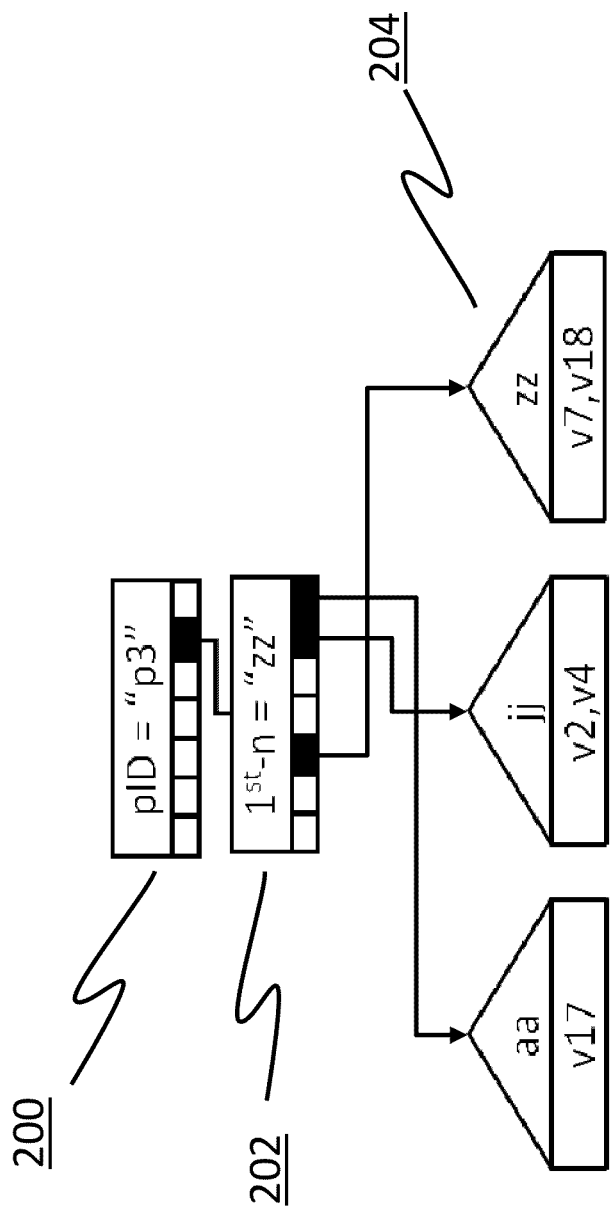
FIG. 7 depicts a small portion of the constructed PV-Index corresponding to a portion of the XML document instance from FIG. 3.

With reference to FIG. 7, a partial example of what the two level index looks like for PID="p3" with the value partition length n-characters "n=2". The level-one partition is shown 200, and the level-two partition is shown 202. For this example, the element nodes contain the following values: {v2="jjj", v4="jjj", v7="zzz", v17="aaa", v18="zzz"}. Consider the query /a/b/c[text( )="zzz"]. First the PID="p3" is extracted from the SUM-Index 200, the level-one partition. Next, the value "p3" is used to lookup the second level n-character partition associated with "p3" in 202. Lastly, the search tree 204 rooted by the partition key value "zz" is located and processed, returning the VALUE tuple keys of "v7" and "v18". When scanning for a particular value without first specifying a node label. then each value partition will need to be searched.

When the Simple API for XML (SAX) is used to parse and load the input XML document, as part of the SAX event stream, characters are presented in document order and one tuple is written to the VALUE table for each SAX character event. When nested structure is embedded within character strings, reconstruction must consider the embedding. This is accomplished using the same descendant containment relationship that is used for the STRUCTURE table: bounding all tuples using oid(t)<oid(d) and oid(d)<oid(ff(t)) where the oid( ) function provides the preorder, d are the descendant tuples, including characters and elements, t is the first text node and ff(t) is the first follower of the first text node associated with the requested element node.

The SUM-Index, FIG. 4, is used to determine the applicable PID set and the starting position for each location step. The way in which a query is handled depends upon the complexity of the query. Queries without predicates and with ancestor-descendant or parent-child relationships can be processed unmodified against the SUM-Index. Other queries will need to be partially decomposed and modified before they can be used to query the SUM-Index. To map the inputted query to match the needs of the internal data structures we rewrite the original query.

When the XPath query is ancestor-descendant or parent-child and without predicates then the query is executed directly against the SUM-Index. The result is a set of PID values that are processed against the PS-Index. When a single PID value is derived from the SUM-Index then the cursor sequentially iterates through the leaf nodes in a single B+Tree partition in the PS-Index. When multiple PID values exist, the B+Tree leaf nodes from all participating partitions from the PS-Index are merged to ensure document order is retained.

Figure 8:
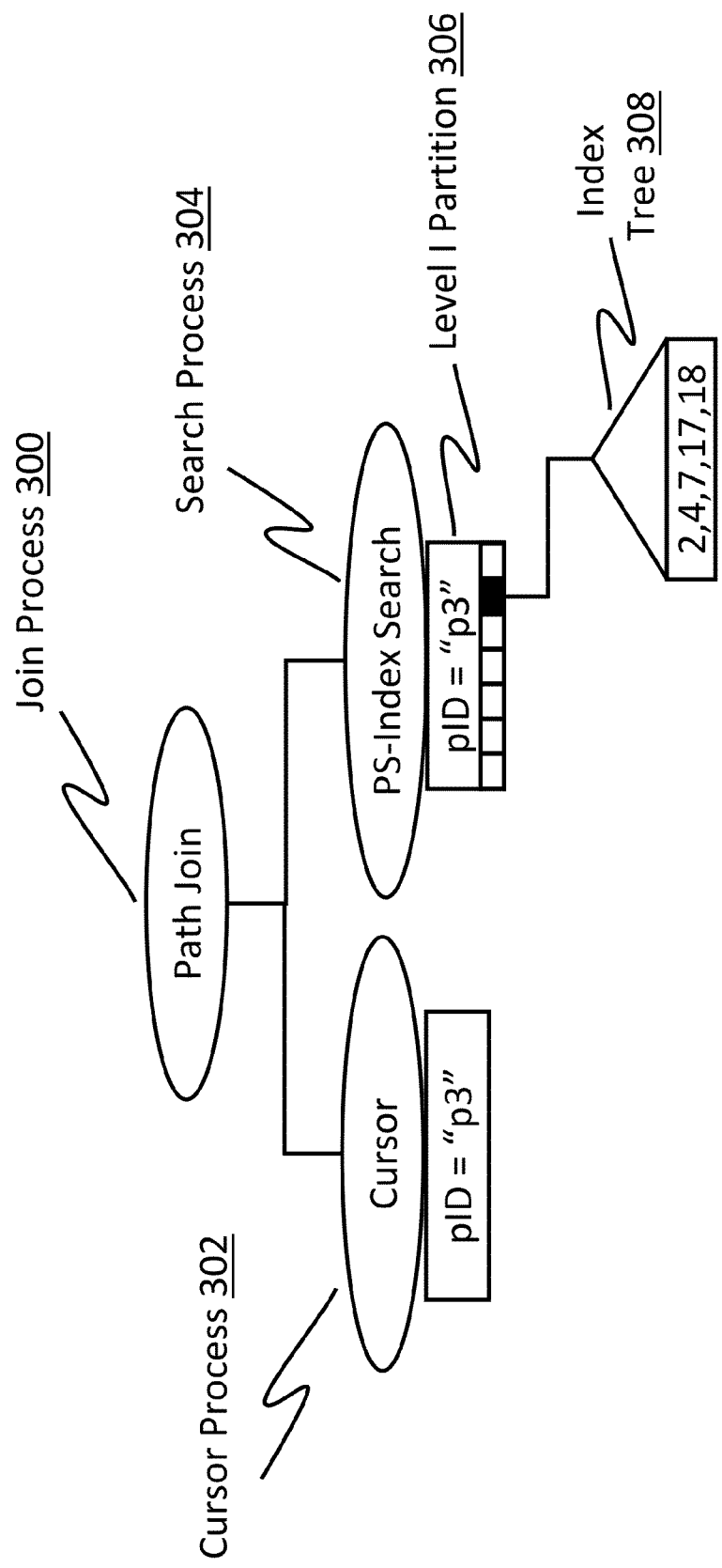
FIG. 8 depicts a simple query plan for an XPath query used on the XML document instance from FIG. 3.

For example, consider a simple descendant path XPath query, such as //b//c for the example document FIG. 3. The execution plan for the query is shown in FIG. 8, which is derived from the Access Method Selection Processing 32 (FIG. 1). The Access Method Selection Processing 32 (FIG. 1) determines that a Join Process 300 is needed which includes a Cursor Process 302 and a Search Process 304 with the level-one partition 306. The XPath query is executed against the SUM-Index to determine the candidate PID values that are used to determine which partition to scan within the PS-Index, which in this case is partition "p3", shown in 306. Next, the search tree 308 associated with partition PID="p3" is located and traversed by iteration across the leaf entries, providing the result sequence in document order. For simple descendant XPath queries, the cursor 302 will only contain a single PID, which is the trivial case. However, the cursor 302 will contain multiple PIDs whenever the query on the summary index returns more than one path identifier.

Figure 9:
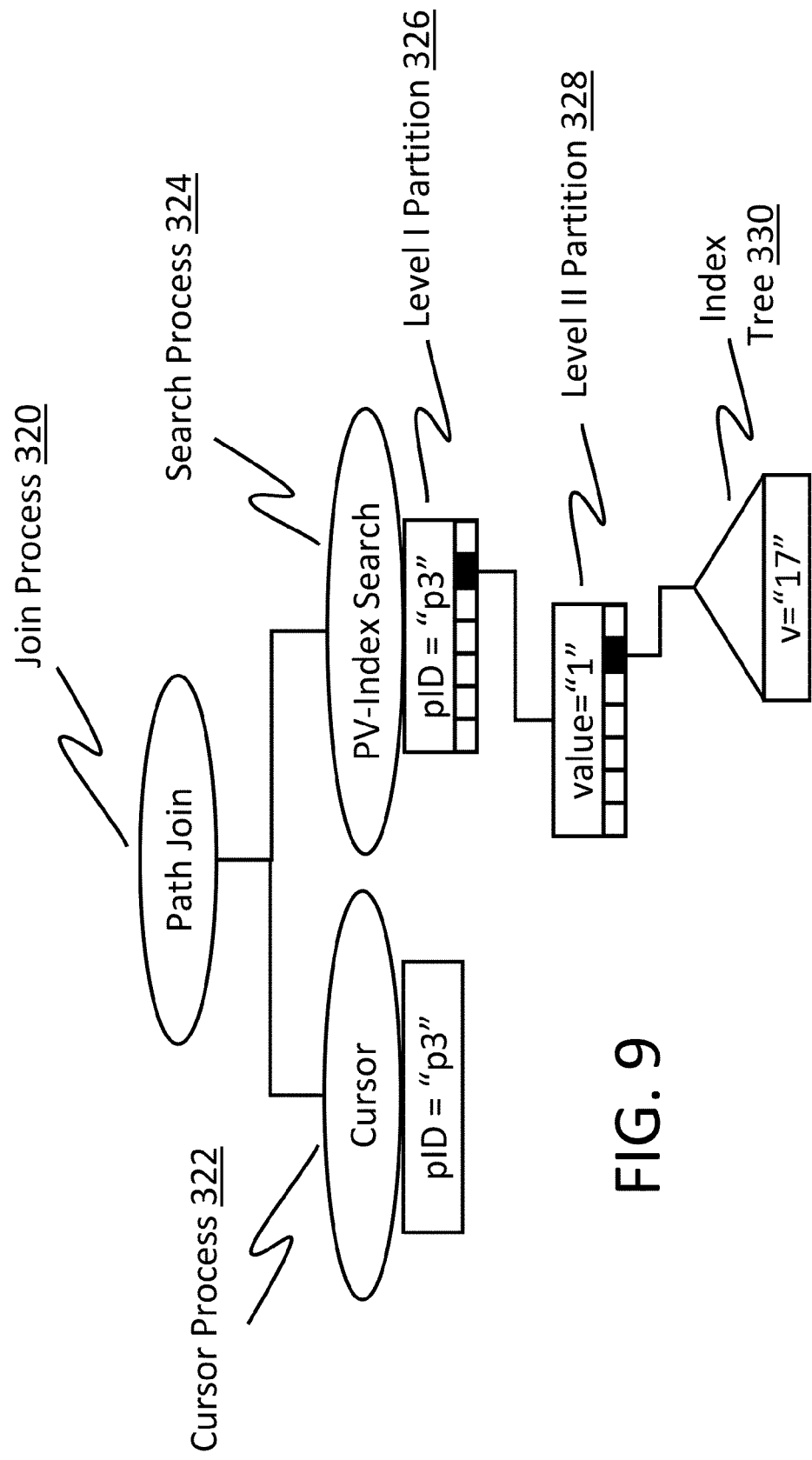
FIG. 9 depicts a simple query plan for an XPath query used on the XML document instance from FIG. 3.

Consider another XPath query, one with a single predicate value filter: //c[text( )="17"]. The execution plan produced by the Access Method Selection Processing 32 produces the execution plan shown in FIG. 9. For purposes of this example, assume that the value associated with each node in FIG. 3 is the preorder number; thus, node 17 contains the value 17; and assume that the length of the n-characters partition key is n=1. To solve this query a path join 320 is used; the driver cursor 322 will obtain the partition PID="p3" from the SUM-Index. Next, the PV-Index is searched 324. First, the required Level I partition 326 is selected, PID="p3". Second, the associated Level II partition 328 is selected, using the first n-characters from the predicate, which is "1" in this example. The Level II predicate returns the root of the B+Tree 330 which contains all fields beginning with a "1". Third, the B+Tree 330 is searched, returning the node where the value "17" is located.

Complex XPath queries typically contain predicates and branching paths, so to solve these types of queries the MPBPC is used. These query constructs can appear in any location step within a query such as with the query //b[e][c/g]. Simply deriving an ordered set of PID values from SUM-Index will not suffice, since each node in a node sequence for a given location step that contains a predicate must be tested individually within the context of the whole XML document. The MPBPC logically performs a partitioned branching path join simultaneously on multiple and separate path partitions within the PS-Index. The cursor simultaneously maps and processes, in document order, sets of PID values to each of the location steps in the query where branching paths occur.

The MPBPC is holistic in that it processes the query tree pattern using a series of recursive index nested loop joins, called "INLJ". The XPath query is converted into a tree pattern which is processed against the PS-index in a single pass. All predicates are solved in the single pass. The optimizer is largely rules based except when multiple predicates exist in the same location step. When multiple predicates exist in the same location step, the cardinality and expected filter probability of the index partition for each predicate is used to determine the evaluation order for multiple predicates. The cursor processes only those nodes that have been established by the SUM-Index to be located on relevant paths needed for answering the specific predicates. Otherwise, the cursor uses the left-deep tree traversal.

When the XPath query contains one or more predicates, such as a branching path filter or value filters, the query needs to be decomposed. The query is split at each location step that contains a predicate, called an "articulation" point or step. For each predicate, a separate cursor is created in the MPBPC query tree that contains the appropriate PID values. The cursor for each predicate is added to the predicate list: PL=<P1, P2, . . . , Pn>, that is associated with the owning location step. The predicate list for a location step is ordered in ascending cardinality and expected filter probability of the corresponding B+Tree indexes referenced. Since predicate lists are processed from left to right, this allows for an efficient early out strategy. The process is recursively defined for one or more predicates at each location step and for all location steps within the original query.

Since the SUM-Index query has already determined the candidate PID values, the remaining query processing step necessary for MPBPC to perform before externalizing the result sequence is to apply the predicates to each of the nodes that are tracked by the MPBPC cursor tree. For the MPBPC to process the query it first attaches itself to the appropriate PS-Index partitions. When the MPBPC starts processing against the PS-Index, each branch in the MPBPC contains the PID. Using the PID the proper partitioned B+Tree index is selected. Each branch in the MPBPC is positioned at the beginning of the appropriate sequentially ascending linked list of the leaf entries of the partitioned B+Tree index. Each partitioned B+Tree index contains node identifiers in document order. Essentially, the B+Tree indexes provide PID specific preorder sequences. The path specific sequences are joined as specified by the MPBPC producing the output sequence, provided each node passes its' respective predicate criteria.

The MPBPC process is made up of several sub-processes. Node sequences from multiple cursors are processed in document order by using an enhanced variation of a priority heap algorithm.

Figure 10:
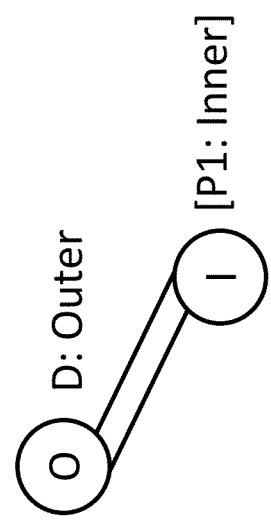
FIG. 10 depicts a nested MPBPC query plan for an XPath query used on the XML document instance from FIG. 3.

Suppose, we examine the abstract query execution plan in FIG. 10. We have an outer sequence that has an inner branching path sequence of arbitrary depth that needs to be tested within a predicate filter. The partition PID values for each node in the query plan are placed into cursors and attached to their respective nodes in the MPBPC query tree.

Figure 11:
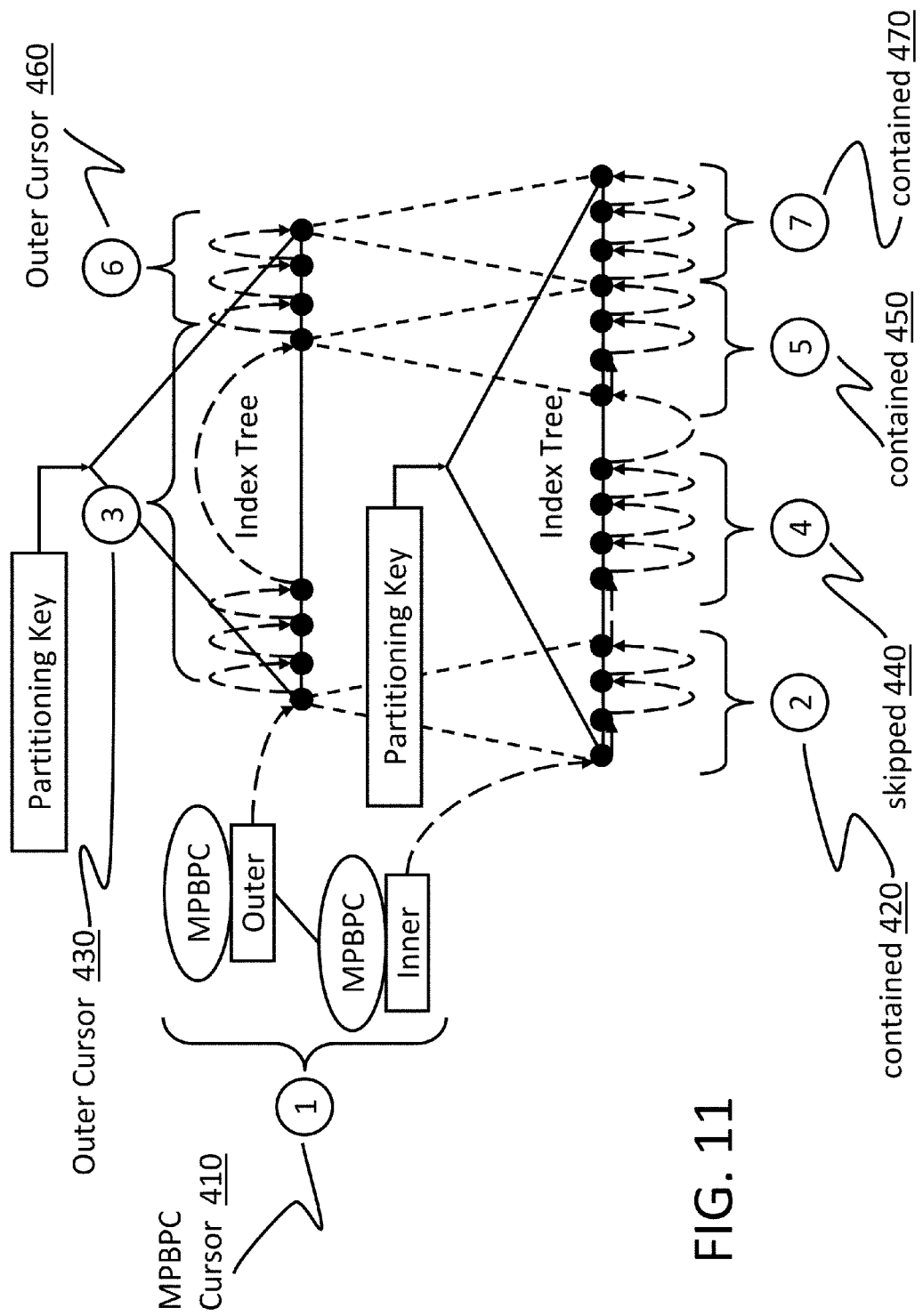
FIG. 11 depicts the process the MPBPC query process uses to solve for an XPath query used on the XML document instance from FIG. 3.

Now, examine FIG. 11, which shows how the query plan in FIG. 10 will join two separate path partitions within the PS-Index. Each B+Tree stores the preorder sequences for a given PID partition in document order. Step one 410, the MPBPC positions the "Outer" and "Inner" cursors at the first B+Tree leaf entry. In step two 420, the nodes in the "Inner" sequence are tested and determined to be contained within the ancestry of the first outer node; so these nodes are added to the output sequence. When there are no more descendant nodes contained, step two 420, then the "Outer" cursor advances until there is a descendant node that is contained, shown in 430 step three. Next the irrelevant, non-contained, descendant nodes are skipped in 440, step four. In step five 450, the next set of descendant nodes that are contained are added to the output sequence. In step six 460, the remainder of the ancestor nodes in the "Outer" cursor not having contained descendants are skipped due to no children until the very last node is encountered. After the first contained descendant is encountered in step seven 470, it is added, along with all of its siblings, to the output sequence. Each node within both cursors is touched, at most, only once. Since the B+Tree indexes are maintained in document-order, each output node is produced in document order without a separate sorting step.

Next we take a more concrete example, based on the example XML document tree shown in FIG. 3. Suppose, the multiple predicate XPath query //b[e][c/g]. The query execution plan is shown in shown in FIG. 12 and the MPBPC execution plan 510 in FIG. 13. Since this query contains a branching path predicate, branching path subtree containment must be tested as well as multiple predicates by the multilevel cursor process 520 that is part of the MPBPC. We need to test all the nodes having PID="p2" as an ancestor 530 where a node having PID="p'7" 560 and a node having PID="p5" 550 are contained in conjunction 540. The result set of each sequence is placed into its own associated cursor. One can clearly see that only those structure nodes that are pertinent to the query will be included and those structure nodes that are superfluous, such as the "a" and "c" nodes, are already filtered out.

We disassemble the branching path query at key articulation steps that match the MPBPC query tree requirements. Using the query parts, we form one or more XPath SUM-Index queries, one query for each sub-path. Since the articulation steps match the MPBPC query tree, there is one XPath SUM-Index query created for each node in the MPBPC. Essentially, for our prototype, the articulation steps are any location step having at least one predicate.

Figure 12:
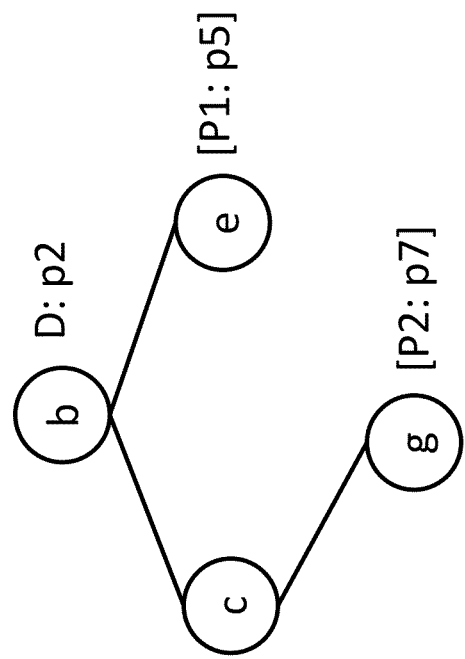
FIG. 12 depicts a branching path query plan for an XPath query used on the XML document instance from FIG. 3.
Figure 13:
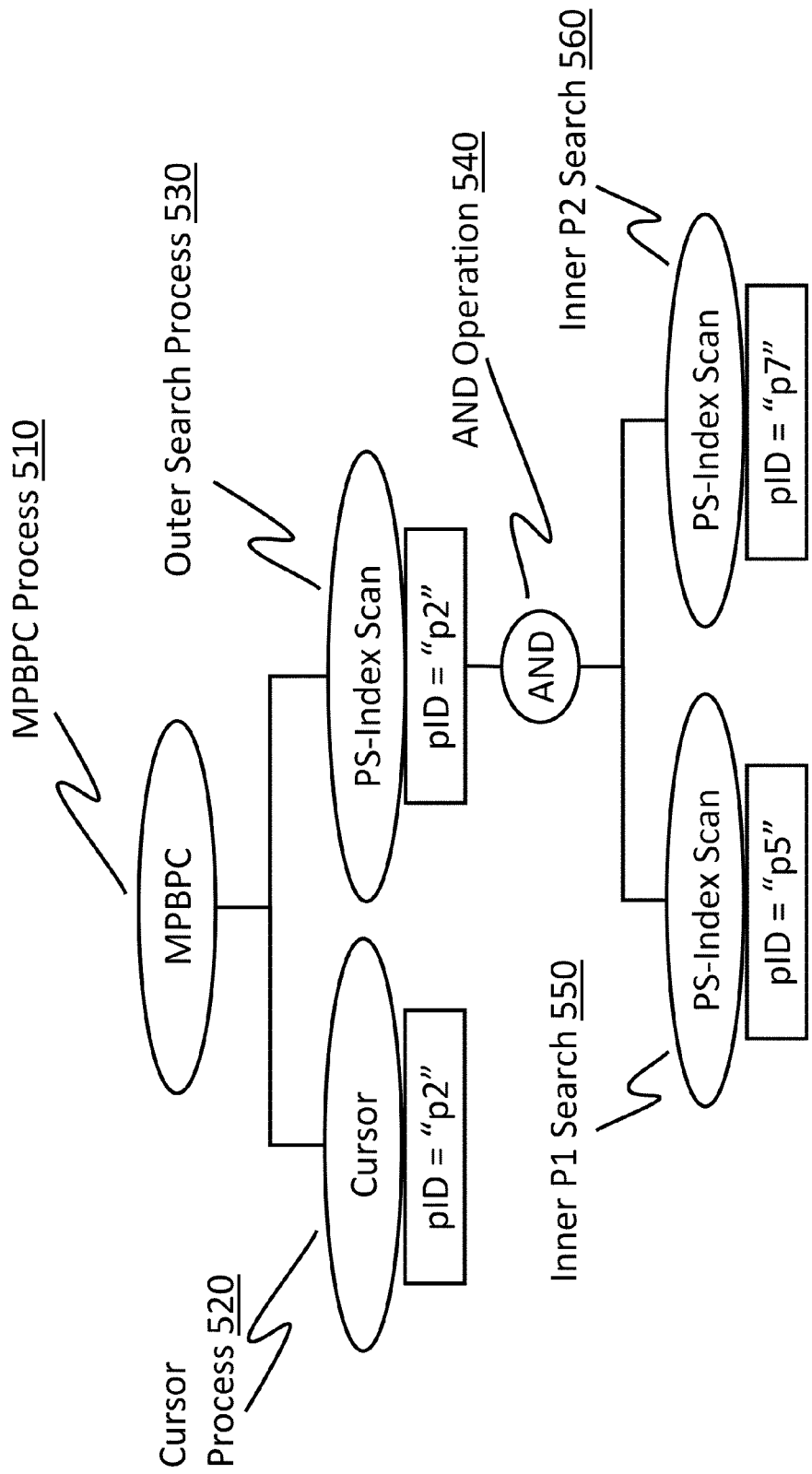
FIG. 13 depicts a branching path query plan for an XPath query used on the XML document instance from FIG. 3.

So using the example query from FIG. 12: //b[e][c/g] we will generate the following three SUM-Index queries to populate the MPBPC 510 query tree with PID values: D for the driver set 530 and P1 550 for the first, and P2 560 for the second, predicate sets in the predicate list:

| D:  | //b     |
| P1: | //b/e   |
| P2: | //b/c/g |

Figure 14:
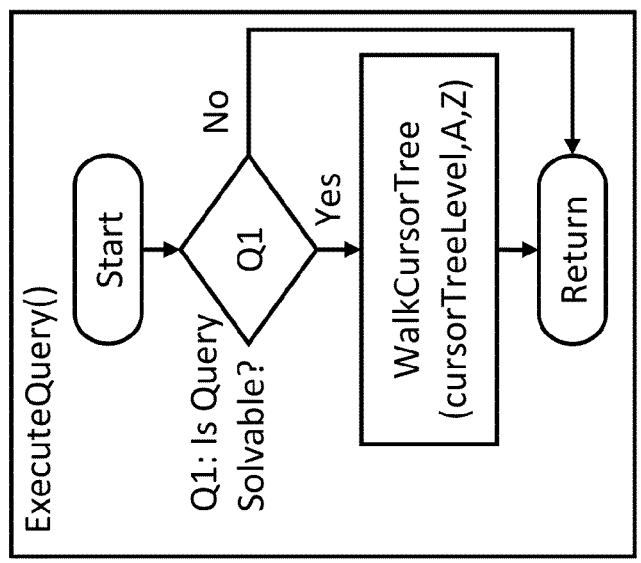
FIG. 14 depicts a flowchart for the Execute Query process.

With reference to FIG. 14, the flowchart logic for the ExecuteQuery process is shown. Only those queries that can be solved are processed further. One example of a non-solvable query is one that returns no nodes from the SUM-Index.

Figure 15:
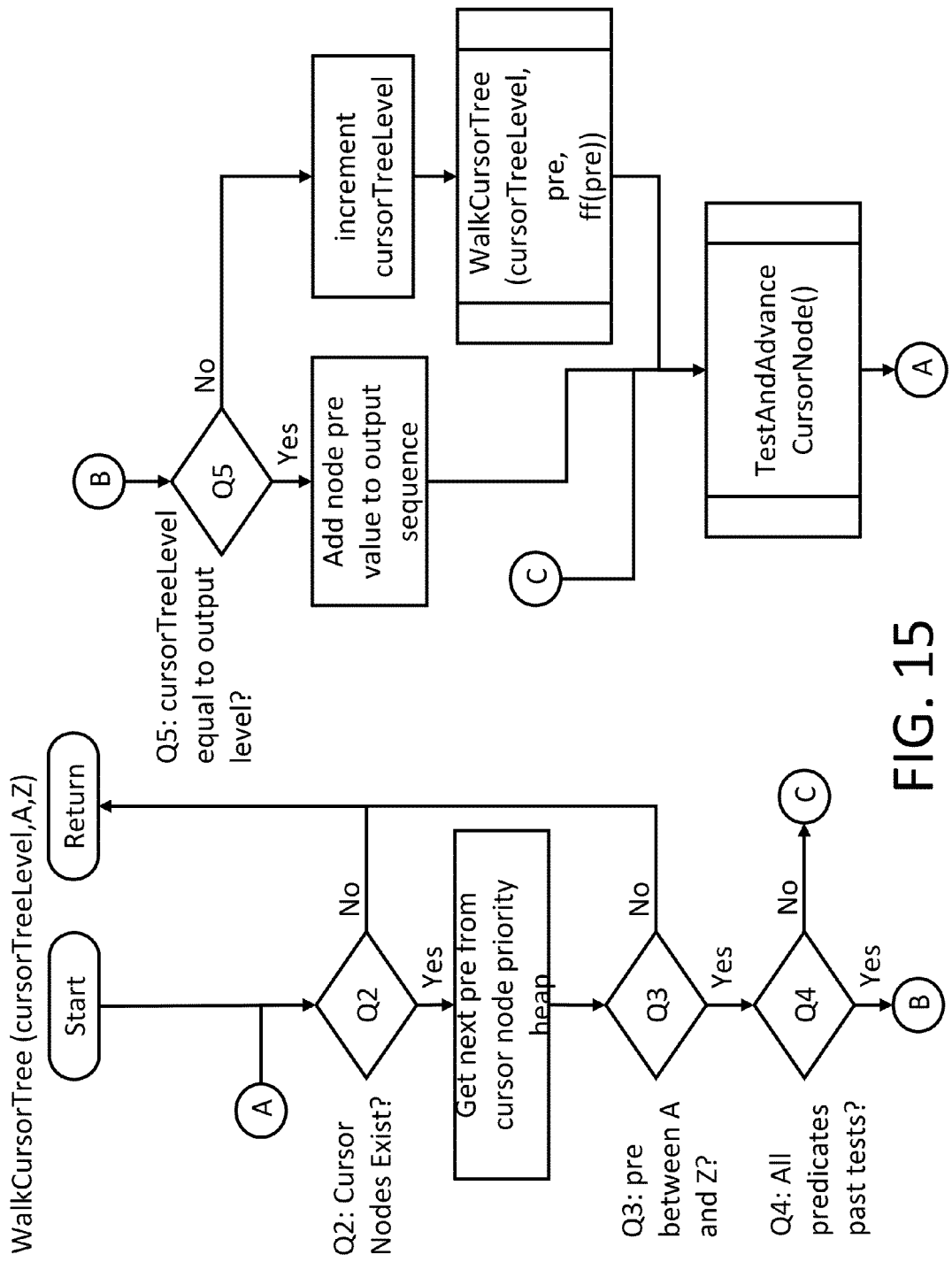
FIG. 15 depicts a flowchart for the sequential Walk Cursor Tree process.

With reference to FIG. 15, the flowchart logic for the WalkCursorTree process is shown for a sequential implementation. This process forms a logic loop that processes all nodes in the cursor in document order. Alternatively, out-of-order and parallel processing can be used to process all nodes in the cursor simultaneously, but this approach will require a sort at the end of the whole process to ensure the results are presented in document order.

Figure 16:
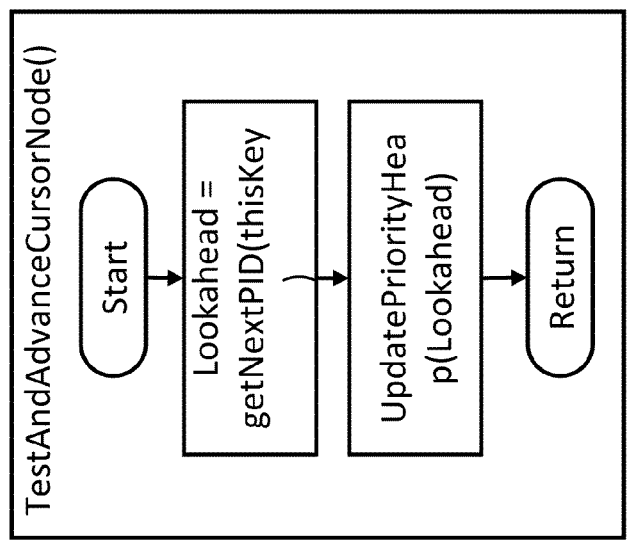
FIG. 16 depicts a flowchart for the Test And Advance Cursor Node process.

With reference to FIG. 16, the flowchart logic for the TestAndAdvanceCursorNode process is shown for a sequential embodiment. This process ensures that the next node provided is done so in document order and is used with for a sequential implementation. This process is not used with the alternative embodiment of out-of-order and parallel processing which can process all nodes in the cursor simultaneously in time; using this approach uses a sort at the end of the whole process to ensure the results are presented in document order.

With reference to FIG. 17, the pseudo-code for MPBPC is shown. The ff(pre) is the first follower function for node identified by pre.

The physical storage system for the structure table was implemented using binary association tables (BAT). The BAT approach is enhanced with the Virtual Memory Manager (VMM) Processing 26, which enables independent loading of parts of each column that are only the B+Tree partitions needed by the query, essentially working with only those B+Tree leaf blocks that are directly relevant to the current path and those nodes are presented to the cursor in document order. The size of the each BAT column store is: 2* size of a memory address* number of nodes. Using a BAT ensures efficient use of modern CPU cache memory hierarchies.

Once the node selection phase has been completed the final step is projection of the associated subtrees by constructing an output XML document using the selected nodes.

For complex queries, such as branching path queries, we use the MPBPC to perform PID specific structure index and value index joins, and for simpler queries we merely traverse the leaf entries of the B+Tree without joins, which are presented in document order.

The structure summary is used to identify all relevant PID values. Partitioning on PID eliminates processing nodes that do not contribute to solving the query. The structure nodes accessed are only those nodes that are pertinent to resolving the query at hand. The combination of using a structure summary in conjunction with PID partitioned indexes provides an efficient method for solving XPath queries.

First solving as much of the query as possible against the structure summary determines the shortlist of PID partitions;

and then subsequently examining only the associated PID partitioned indexes reduces the total number of nodes that need to be examined. The first-following node ff(pre) is used when containment needs to be tested efficiently during a MPBPC join between two paths, which is needed when traversing nodes along the leafs of a specific PID partition. Nodes not part of the multiple involved paths are completely excluded from query evaluation.

Referring again to FIG. 1, it is understood that computer system 10 may be implemented as any type of computing infrastructure/device. Computer system 10 generally includes a processor 14, input/output (I/O) 16, memory 18, and bus 12. The processor 14 may comprise a single processing unit, or be distributed across one or more processing units in one or more locations, e.g., on a client and server. Memory 18 may comprise any known type of data storage, including magnetic media, optical media, random access memory (RAM), read-only memory (ROM), a data cache, a data object, etc. Moreover, memory 18 may reside at a single physical location, comprising one or more types of data storage, or be distributed across a plurality of physical systems in various forms.

I/O 16 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 12 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-client, client-server, or server-server environment.

It should be appreciated that the teachings of the present invention could be offered as a business method on a subscription or fee basis. For example, a computer system 10 comprising an XPath query processing system 20 could be created, maintained and/or deployed by a service provider that offers the functions described herein for customers. That is, a service provider could offer to deploy or provide the ability to provide XPath query processing as described above.

It is understood that in addition to being implemented as a system and method, the features may be provided as a program product stored on a computer-readable medium, which when executed, enables computer system 10 to provide an XPath query processing system 20. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 18 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An XPath query processing system for processing one or more inputted queries against one or more inputted XML documents, the system comprising at least one computer system including a plurality of distributed hardware processors (CPU) and memory, at least one distributed hardware processor executing steps that:

creates a first index that comprises unique root to leaf paths (SUM-Index) where each unique root to leaf path has an associated unique path identifier (PID); and
annotates each unique path in SUM-Index by PID;
partitions SUM-Index by PID; and
creates a second index that comprises tree nodes grouped by PID (PS-Index);
partitions PS-Index by PID; and
creates a third index that comprises values of the tree nodes grouped by PID (PV-Index); and partitions PV-Index by PID;
wherein the first index, the second index, and the third index each have at least one path identifier and are linked together by at least one path identifier (PID); and
each unique PID forms a nexus of unique path related information across the first index, the second index, and the third index; and
each index attribute of the first index, the second index, and the third index is stored in a column store; and
decomposes one or more XPath queries into one or more partial XPath queries;
obtains a list of path identifiers from the first index to initialize a simple cursor (SC) access method or a multi-predicate-branching-path cursor (MPBPC) method from the one or more partial XPath queries;
selects the second index to generate a result sequence of nodes using a simple cursor or a MPBPC cursor;
selects the third index to lookup values to filter the result sequence of nodes; and
produces one or more outputted XML documents from the result sequence of nodes.

2. The XPath query processing system of claim 1, wherein the PS-Index is a search index that is partitioned on PID, or has a composite key of PID and preorder.

3. The XPath query processing system of claim 1, wherein the PV-Index is a search index that is partitioned on PID, or has a composite key of PID and preorder.

4. The XPath query processing system of claim 1, wherein the PV-Index is a search index that is partitioned on PID and is multilevel subordinate to the PS-Index linked by PID.

5. The XPath query processing system of claim 1, wherein the SUM-Index, the PS-Index index, and the PV-Index are constructed from schema-defined or schema-less XML documents.

6. The XPath query processing system of claim 1, wherein the SUM-Index, the PS-Index index, and the PV-Index are processed with a simple cursor.

7. The XPath query processing system of claim 1, wherein the SUM-Index, the PS-Index index, and the PV-Index are processed with a multi-predicate branching path cursor, MPBPC, which uses a holistic tree pattern of multilevel nested recursive cursors to simultaneously join PS-index partitions in one pass of the PS Index.

8. A computer implement method for processing one or more inputted XPath queries against one or more inputted XML documents stored in a plurality of computer hardware processors (CPU) and memory, comprising:
loading an XML document into computer memory;
generating a first index that comprises unique root to leaf paths (SUM-Index), a second index that comprises tree nodes grouped by unique path identifiers (PS-Index), and a third index that comprises values of the tree nodes grouped by path identifiers (PV-Index) from the XML document, wherein the SUM-Index, the PS-Index and the PV-Index each have at least one root to leaf unique path identifier (PID) and are linked together by at least one PID originating from the SUM-Index;
annotating the SUM-Index with PID for each unique root to leaf path;
stores the SUM-Index, PS-Index, and PV-Index on column stores distributed across a plurality of CPUs partitioned by PID:
parsing and splitting an XPath query at articulation points into multiple partial queries;
determining cursor type index access methods;
executing a multiple partial queries against the SUM-Index to generate a list of applicable one or more PID values in the PS-Index and the PV-Index that satisfies partial query segments;
generating a set of ancestor-descendant PID identifiers list from an associated SUM-Index tree by extracting annotated PID values to initialize a simple cursor or a multi-predicate branching path cursor (MPBP);
searches the PS-Index that is a search index that is portioned on PID;
generating a result sequence using the simple cursor or the MPBPC cursor from a PS-Index tree;
searches the PV-Index that is a search index that is partitioned on PID;
filtering the result sequence of nodes by using a PV-Index tree; and
producing one or more outputted XML documents from a final result sequence of nodes.

9. The method of claim 8, wherein the executing query searches the PS-Index that is a search index that is partitioned on PID, or has a composite key of PID and preorder.

10. The method of claim 8, wherein the executing query searches the PV-Index that is a search index that is partitioned on PID, or has a composite key of PID and preorder.

11. The method of claim 8, wherein the executing query searches the PV-Index that is a search index that is partitioned on PID and is multilevel subordinate to the PS-Index linked by PID.

12. The method of claim 8, wherein the executing query can be run against a schema-defined or schema-less XML document.

13. The method of claim 8, wherein the executing query is processed with the simple cursor.

14. The method of claim 8, wherein the executing query is processed with the MPBPC cursor which uses a holistic tree pattern of multilevel nested recursive cursors to simultaneously join PS-Index partitions of the PS-Index.

15. A non-transitory computer readable medium having a computer product for processing one or more inputted XPath queries against one or more XML documents, which when executed by a computing device having a plurality of hardware processors (CPU) and memory, comprises:
program code the execution of which generates a first index that comprises unique root to leaf paths (SUM-Index), a second index that comprises tree nodes grouped by unique path identifiers (PS-Index), and a third index that comprises values of the tree nodes grouped by path identifiers (PV-Index) from the XML document, wherein the SUM-Index and the PS-Index and the PV-Index each have at least one unique path identifier (PID) and are linked together by at least one PID originating from the SUM-Index;
program code that annotates the SUM-Index with the PID;
program code that distributes the SUM-Index, PS-Index, and PV-Index across a plurality of CPUs addressed by PID;
program code that executes parsing and splitting of an XPath query at articulation points into multiple partial queries;
program code that determines cursor type index access methods;
program code that examines the SUM-Index to generate a list of applicable PID in the PS-Index and the PV-Index that satisfies partial query segments;

program code that generates a set of ancestor-descendant PID identifiers list from a SUM-Index tree to initialize a simple cursor or a multi-predicate branching path cursor (MPBPC);

program code that accesses a distributed SUM-Index, PS-Index and PV-Index across the plurality of CPUs addressed by PID;

program code that generates a result sequence using the simple cursor or MPBPC cursor from a PS-Index tree;

program code that filters the result sequence of nodes by using an associated PV-Index tree; and program code that produces one or more outputted XML documents from a final result sequences of nodes.

16. The computer readable medium of claim 15, wherein the program code that executes the query searches the PS-Index that is a search index that is partitioned on PID, or has a composite key of PID and preorder.

17. The computer readable medium of claim 15, wherein the program code that executes the query searches the PV-Index that is a search index that is partitioned on PID, or has a composite key of PID and preorder.

18. The computer readable medium of claim 15, wherein the program code that executes the query searches the PV-Index that is a search index that is partitioned on PID and is multilevel subordinate to the PS-Index linked by PID.

19. The computer readable medium of claim 15, wherein the program code that executes the query is executed against a schema-defined or schema-less XML document.

20. The computer readable medium of claim 15, wherein the program code that executes the query uses the simple cursor.

21. The computer readable medium of claim 15, wherein the program code that executes the query uses the multi-predicate branching path cursor, MPBPC, which uses a holistic tree pattern of multilevel nested recursive cursors to simultaneously join PS-Index partitions of the PS-Index.

22. A method for deploying a system across a plurality of computer hardware processors (CPUs) and memory for processing one or more inputted XPath queries against one or more XML documents, comprising:

providing a computer infrastructure being operable to:

generate an a first index that comprises unique root to leaf paths (SUM-Index), a second index that comprises tree nodes grouped by unique path identifiers (PS-Index), and a third index that comprises values of the tree nodes grouped by path identifiers (PV-Index) from an XML document, wherein the SUM-Index and the PS-Index and the PV-Index each have at least one unique path identifier (PID) and are linked together by at least one PID originating from the SUM-Index;

distribute the XML document across a plurality of distributed CPUs addressed by PID;

execute parsing and splitting of an XPath query at articulation points into multiple partial queries;

determine cursor type index access methods;

execute the partial queries against the SUM-Index to generate a list of applicable PID in the PS-Index and the PV-Index that satisfies partial query segments;

generate a set of ancestor-descendant PID identifiers list from a SUM-Index tree to initialize a simple cursor or a multi-predicate branching path cursor (MPBP);

access the plurality of distributed CPUs addressed by PID;

generate a result sequence using the simple cursor or the MPBPC cursor from a PS-Index tree;

filter the result sequence of nodes by using an associated PV-Index tree; and produce one or more outputted XML documents from a final result sequences of nodes.

* * * * *

UNITED STATES PATENT AND TRADEMARK OFFICE
CERTIFICATE OF CORRECTION

| | | |
|---|---|---|
| PATENT NO. | : 8,631,028 B1 | Page 1 of 1 |
| APPLICATION NO. | : 12/915791 | |
| DATED | : January 14, 2014 | |
| INVENTOR(S) | : Primo M. Pettovello | |

It is certified that error appears in the above-identified patent and that said Letters Patent is hereby corrected as shown below:

In the Claims

Column 15, Line 37, Claim 6:

After "processed with" delete "a" and insert -- the --.

Signed and Sealed this
Seventeenth Day of June, 2014

Michelle K. Lee
*Deputy Director of the United States Patent and Trademark Office*